(12) United States Patent
Kurita et al.

(10) Patent No.: US 8,384,805 B2
(45) Date of Patent: Feb. 26, 2013

(54) IMAGE PROCESSING DEVICE, METHOD, AND COMPUTER-READABLE MEDIUM FOR EXECUTING PIXEL VALUE CORRECTION IN A SYNTHESIZED IMAGE

(75) Inventors: Teppei Kurita, Tokyo (JP); Yoshikuni Nomura, Tokyo (JP); Shun Kaizu, Tokyo (JP); Satoru Takeuchi, Chiba (JP); Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 12/879,877

(22) Filed: Sep. 10, 2010

(65) Prior Publication Data

US 2011/0115942 A1    May 19, 2011

(30) Foreign Application Priority Data

Sep. 18, 2009 (JP) ................ P2009-216530
Mar. 2, 2010 (JP) ................ P2010-044944

(51) Int. Cl.
*H04N 5/217* (2011.01)
(52) U.S. Cl. ............. 348/241; 382/275
(58) Field of Classification Search ............ 348/207.99, 348/222.1, 223.1, 225.1, 362, 241; 382/163, 382/167, 274, 275, 300
See application file for complete search history.

(56) References Cited

U.S. PATENT DOCUMENTS

| | | | | |
|---|---|---|---|---|
| 6,204,881 | B1 * | 3/2001 | Ikeda et al. | 348/362 |
| 6,650,363 | B1 * | 11/2003 | Ukita | 348/223.1 |
| 2002/0135683 | A1 * | 9/2002 | Tamama et al. | 348/222 |
| 2004/0201759 | A1 | 10/2004 | Horiuchi | |
| 2005/0052546 | A1 * | 3/2005 | Nakabayashi et al. | 348/223.1 |
| 2006/0262196 | A1 * | 11/2006 | Hasegawa et al. | 348/223.1 |
| 2008/0031336 | A1 | 2/2008 | Yamaguchi | |
| 2008/0181495 | A1 * | 7/2008 | Spampinato et al. | 382/167 |
| 2008/0219585 | A1 * | 9/2008 | Kasai et al. | 382/274 |
| 2009/0052769 | A1 | 2/2009 | Kang et al. | |

FOREIGN PATENT DOCUMENTS

| | | |
|---|---|---|
| EP | 1 677 548 A2 | 7/2006 |
| JP | 2008-99158 | 4/2008 |
| JP | 2008-227697 | 9/2008 |
| WO | WO 2007/106898 A1 | 9/2007 |

OTHER PUBLICATIONS

European Search Report and Opinion dated Aug. 9, 2012, issued in European Application No. 10174844.0.
Chang, L. et al., "Hybrid color filter array demosaicking for effective artifact suppression", *J. Elec. Imaging*, 15(1):013003-1-13003-17 (2006).
Khan, E.A. et al., "Ghost Removal in High Dynamic Range Images", 2006 IEEE International Conference on Image Processing, ICIP 2006 Proceedings, Oct. 8-11, 2006, Atlanta, GA, USA., pp. 2005-2008.

* cited by examiner

*Primary Examiner* — Nelson D. Hernández Hernández
*Assistant Examiner* — Dennis Hogue
(74) *Attorney, Agent, or Firm* — Finnegan Henderson Farabow Garrett & Dunner LLP

(57) ABSTRACT

An image processing device includes an image correction unit which receives a synthesized image and pseudo color pixel information indicating a pseudo color pixel position included in the synthesized image and executes pixel value correction. The image correction unit selects non-pseudo color pixels as reference pixels from a reference region set in a surrounding region of the pixel to be corrected, sets a similarity weight coefficient in which a large weight is set as a pixel value of the reference pixel that is close to a pixel value of the pixel to be corrected and a pixel position weight coefficient in which a large weight is set as the pixel value of the reference pixel that is near a pixel position of the pixel to be corrected, with respect to the reference pixels, and determines a correction pixel value of the pixel to be corrected by a weighted summation process.

12 Claims, 15 Drawing Sheets

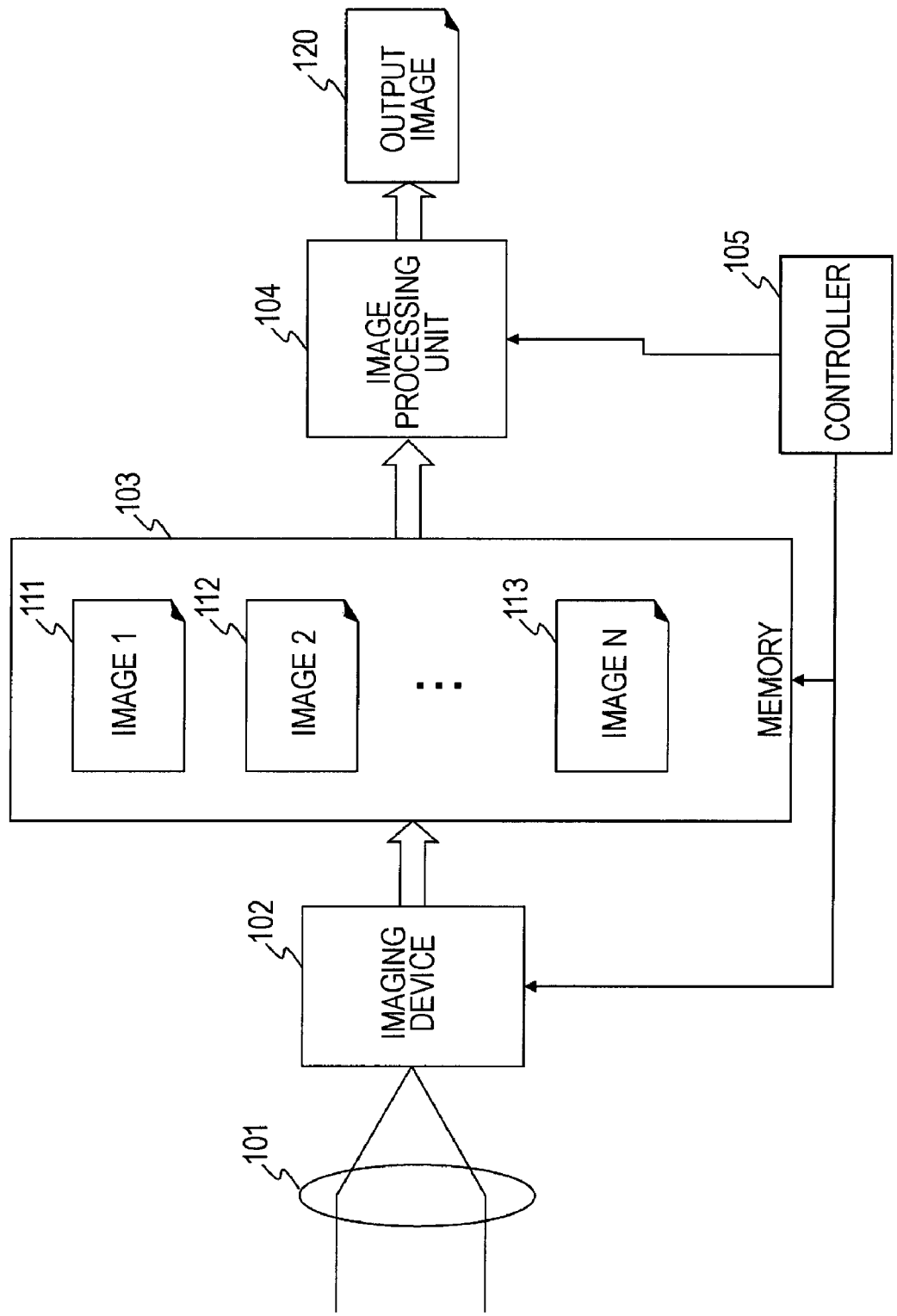

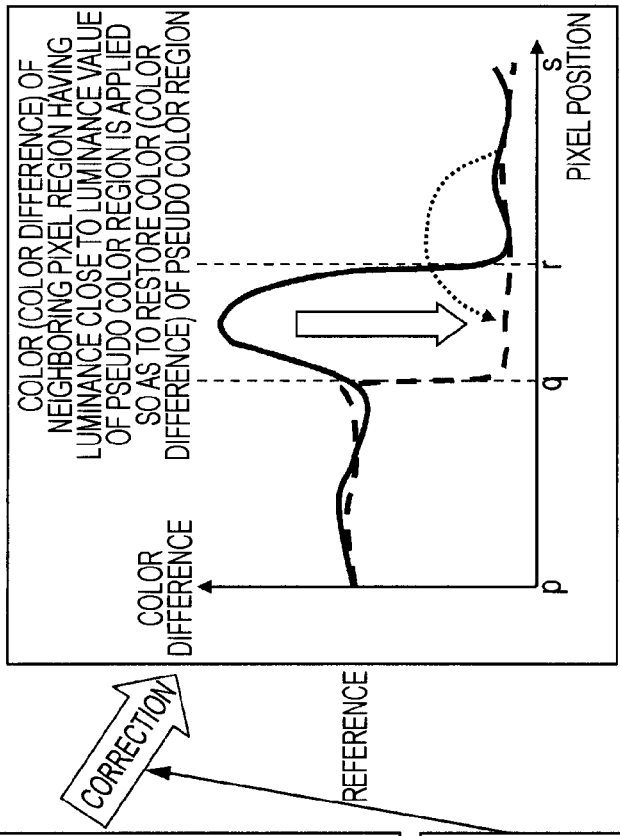
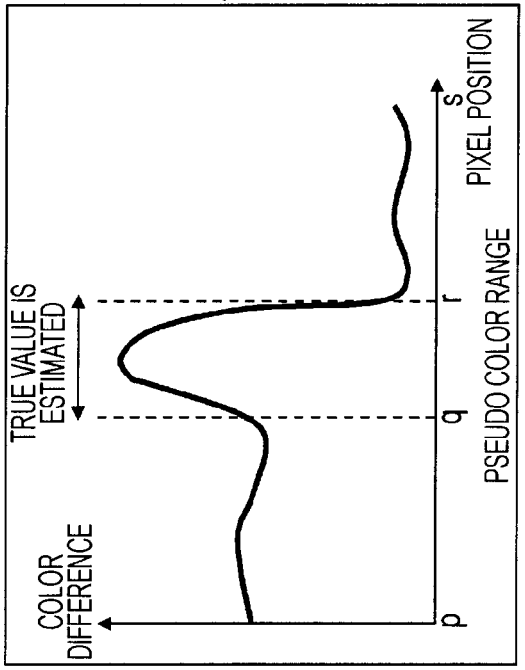
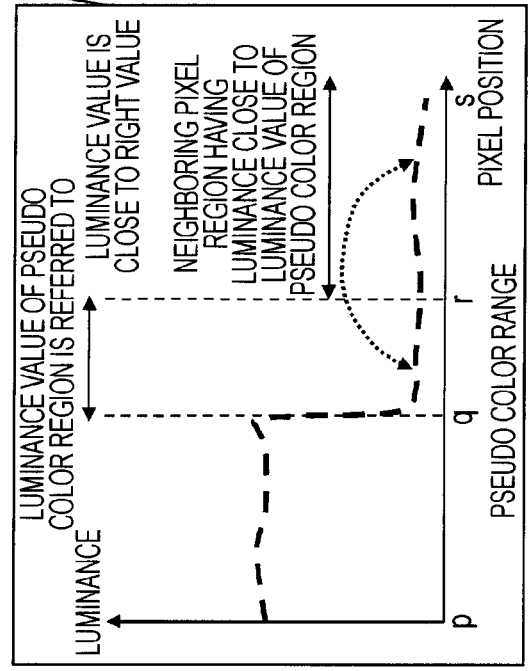

FIG. 5

| 1 | 1 | 1 | 1 | 1 | 1 | 1 | 1 |
|---|---|---|---|---|---|---|---|
| 1 | 1 | 1 | 1 | 1 | 1 | 0 | 1 |
| 1 | 1 | 1 | 1 | 1 | 0 | 0 | 1 |
| 1 | 1 | 1 | 1 | 1 | 1 | 0 | 1 |
| 1 | 1 | 1 | 1 | 1 | 1 | 1 | 1 |
| 1 | 0 | 1 | 1 | 1 | 1 | 1 | 1 |
| 1 | 0 | 0 | 0 | 1 | 1 | 1 | 1 |
| 1 | 1 | 1 | 1 | 1 | 1 | 1 | 1 |
| 1 | 1 | 1 | 1 | 1 | 1 | 1 | 1 |

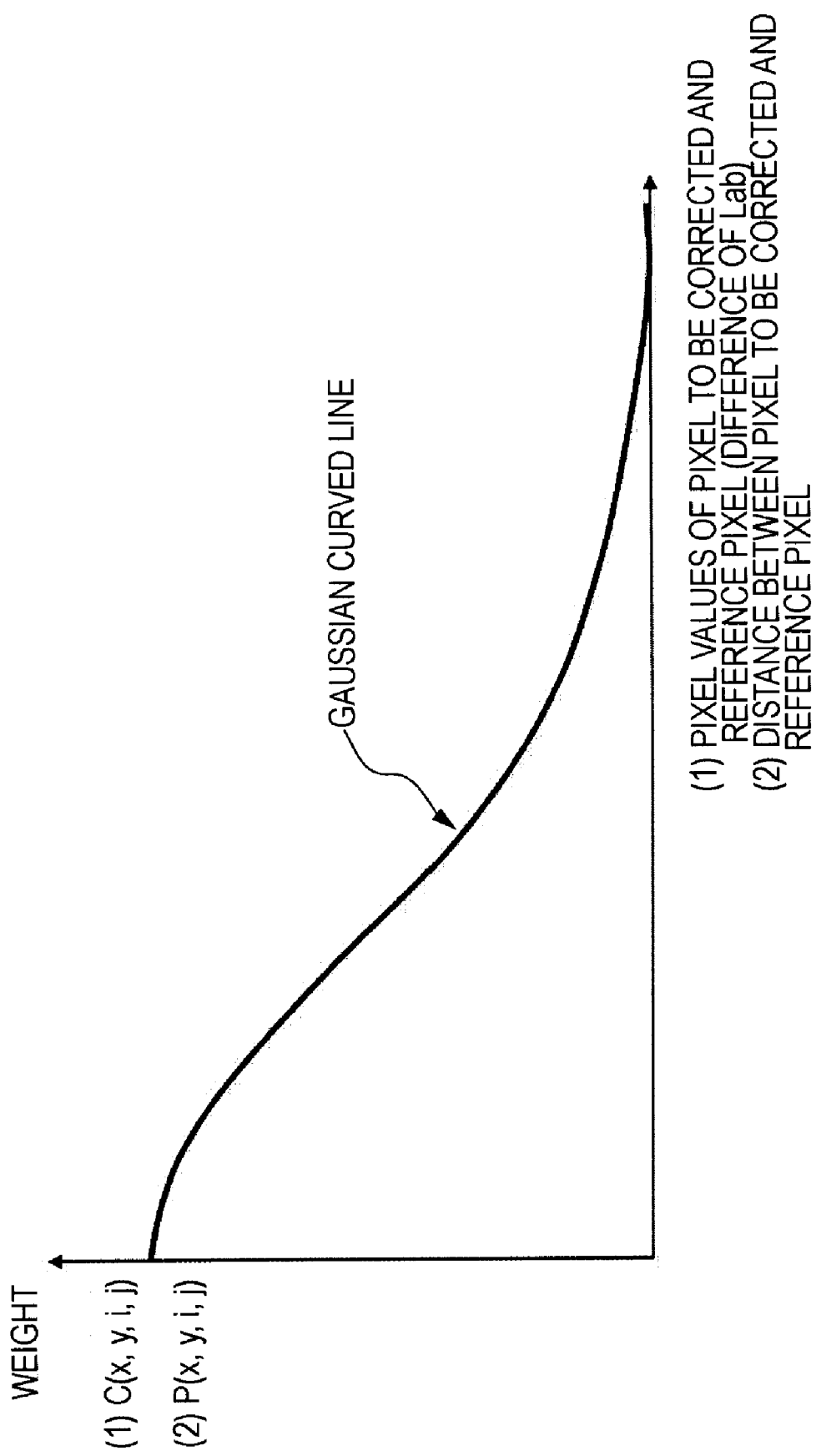

FIG. 8A
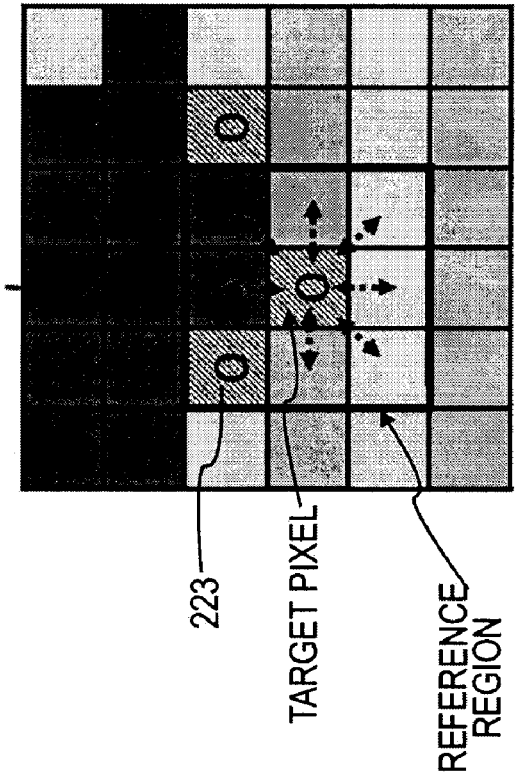
FIG. 8B

WHEN REFERRING TO REDUCED IMAGE

COVERED BY 1/10 OF NUMBER OF TAPS

IMAGE PROCESSING DEVICE, METHOD, AND COMPUTER-READABLE MEDIUM FOR EXECUTING PIXEL VALUE CORRECTION IN A SYNTHESIZED IMAGE

BACKGROUND OF THE INVENTION

1. Field of the Invention

The present invention relates to an image processing device, an imaging apparatus, an image processing method and a program and, more particularly, an image processing device for performing a correction process of a pixel value of a synthesized image generated using a plurality of images, an imaging apparatus, an image processing method, and a program.

2. Description of the Related Art

A solid-state imaging element, such as a CCD image sensor or a Complementary Metal Oxide Semiconductor (CMOS) image sensor, used in a video camera, digital camera or the like, accumulates charges according to an incident light amount and performs photoelectric conversion for outputting an electrical signal corresponding to the accumulated charges. However, since there is an upper limit in charge accumulation amount of a photoelectric conversion element, if a certain amount of light or more is received, the charge accumulation amount reaches a saturation level. Thus, a so-called whitening-out fixed at a saturated luminance level occurs in a subject region having a certain brightness or greater.

In order to prevent such a phenomenon, a process of controlling a charge accumulation period of the photoelectric conversion element according to a variation in external light or the like so as to adjust an exposure time such that sensitivity is controlled to an optimal value is performed. For example, a shutter is released with respect to a bright subject at a high speed so as to shorten an exposure time and the charge accumulation period of the photoelectric conversion element is shortened so as to output the electric signal before the charge accumulation amount reaches the saturation level. By such a process, it is possible to output an image capable of accurately ensuring reproduction of the grayscale according to the subject.

However, in photographing a subject in which a bright place and a dark place are mixed, if the shutter is released at a high speed, a sufficient exposure time may not be taken for the dark place. Thus, an S/N ratio deteriorates and image quality deteriorates. In an image obtained by photographing the subject in which the bright place and the dark place are mixed, in order to accurately reproduce the luminance level of a dark portion, a process of realizing a high S/N ratio by a long exposure time in pixels in which the amount of incident light on an image sensor is small and avoiding saturation in pixels in which the amount of incident light is large is necessary.

As a method of realizing such a process, a method of using a plurality of images having different exposure times is known. That is, a method of using a long-time exposure image in a dark image region and using a short-time exposure image in a bright image region in which whitening-out seems to occur in the long-time exposure image so as to determine optimal pixel levels may be used. By synthesizing a plurality of different exposure images, it is possible to obtain an image with a wide dynamic range, in which whitening-out does not occur.

For example, Japanese Unexamined Patent Application Publication No. 2008-99158 or Japanese Unexamined Patent Application Publication No. 2008-227697 discloses a configuration in which an image with a wide dynamic range is obtained by synthesizing a plurality of images having different exposure amounts. This process will be described with reference to FIG. 1. An imaging device, for example, outputs image data of two different exposure times within a video rate (30 to 60 fps) in moving-image photographing. In addition, image data of two different exposure times is generated and output in still-image photographing. FIG. 1 is a diagram illustrating the characteristics of images having two different exposure times (long-time exposure image and short-time exposure image) generated by the imaging device. A horizontal axis denotes a time t and a vertical axis denotes the charge accumulation amount e in a light sensing photodiode (PD) configuring a photoelectric conversion element corresponding to one pixel of a solid-state imaging element.

For example, in a bright subject in which the light sensing amount of the light sensing photodiode (PD) is large, as shown in a high luminance region 11 of FIG. 1, the charge accumulation amount is rapidly increased with the elapse of time. In contrast, in a dark subject in which the light sensing amount of the light sensing photodiode (PD) is small, as shown in a low luminance region 12 of FIG. 1, the charge accumulation amount is slowly increased with the elapse of time.

A time t0 to t3 corresponds to an exposure time TL for acquiring the long-time exposure image. In a line indicated as the low luminance region 12 of the long-time exposure time TL, the charge accumulation amount does not reach a saturation level at a time t3 (non-saturation point Py), and accurate grayscale expression is obtained by the grayscale level of the pixel determined using an electric signal obtained by the charge accumulation amount Sa.

However, in a line indicated as the high luminance region 11, the charge accumulation amount reaches the saturation level (saturation point Px) before reaching the time t3. Accordingly, in the high luminance region 11, only a pixel value corresponding to an electric signal of the saturation level is obtained from the long-time exposure image and, as a result, whitening-out occurs in the pixel.

In the high luminance region 11, at a time before reaching the time t3, for example, at a time t1 (charge sweep-out start point P1) shown in the drawing, the charges accumulated in the light sensing photodiode (PD) are swept out. The charges are swept out not to all charges accumulated in the light sensing photodiode (PD) but to an intermediate voltage retention level controlled in the photodiode PD. After the charge sweep-out process, short-time exposure is executed again during an exposure time TS (t2 to t3). That is, the short-time exposure is performed from the short-time exposure start time P2 to the short-time exposure end time P3 shown in the drawing. By the short-time exposure, the charge accumulation amount Sb is obtained, and the grayscale level of the pixel is determined based on the electric signal obtained based on the charge accumulation amount Sb.

In addition, when the pixel value is determined based on the electric signal based on the charge accumulation amount Sa obtained by the long-time exposure in the low luminance region 12 and the electric signal based on the charge accumulation amount Sb obtained by the short-time exposure in the high luminance region 11, an estimated charge accumulation amount when the same-time exposure is performed or an electric signal output value corresponding to the estimated charge accumulation amount is calculated and a pixel value level is determined based on the calculated result.

By combining the short-time exposure image and the long-time exposure image, it is possible to obtain an image with a wide dynamic range, in which whitening-out does not occur.

However, the plurality of images having different exposure amounts becomes images photographed at different timings. Accordingly, when the subject is moved during photographing, a deviation in images occurs when the images are synthesized. As a result, a pseudo color is generated in an image portion of a moving subject region and thus image quality deteriorates. In addition, even when the subject is not moved, the same image quality deterioration may occur if the luminance of the subject is changed.

Japanese Unexamined Patent Application Publication No. 2008-227697 discloses a pixel value correction method for solving such a problem. As described above, in the "image with the wide dynamic range" generated by the synthesized image, the pixel value becomes an erroneous value in each position of a pixel position in which the luminance of the subject is changed from high luminance to low luminance and a pixel position in which the luminance of the subject is changed from low luminance to high luminance and thus grayscale failure of the pixel occurs or a pseudo color is generated in the image.

In Japanese Unexamined Patent Application Publication No. 2008-227697, correction is executed with respect to such an image so as to suppress the grayscale failure of the pixel or generation of the pseudo color. The correction method will now be described. When the pixel value of an original image is Dv and the pixel value of the same position in the image obtained by performing a blurring process with respect to the original image is Mv, coefficients a and b (a+b=1) are applied and the pixel value [Rv] of the same position of the output pixel determined as the pseudo color is calculated as follows.

$$[Rv]=a \times [Dv] + b \times [Mv]$$

Since the blurring process has a purpose of applying, for example, a general low-pass filter (LPF) and blurring the image in regard to the applied filter size (the number of taps), two-dimensional expansion of the imaged pixel as a luminance variation is considered.

From the viewpoint of a high possibility that the pseudo color generated in the vicinity of the moving subject has a high frequency component and is not important, the LPF is used. However, if the expansion of the pixel to be corrected is large, the assumption is not satisfied.

In order to correct a place in which the expansion of the pixel to be corrected is large, the number of taps of the filter is set to be large. Thus, since hardware implementation is difficult, information amount is reduced by an image reduction process and the reduced image is enlarged again so as to obtain the same effect as the blurring process. However, according to a photographing environment, a pseudo color having high chroma is output with respect to the moving subject in a large area and the color may be conspicuous even in the blurred image.

In order to avoid this problem, a chroma reduction process is performed with respect to the image to which the LPF is applied. However, in the chroma reduction process, in particular, the correction of the large pseudo color is not sufficient. In addition, in the pixel in which it is erroneously determined that the pseudo color is generated in the moving subject, chroma reduction may be conspicuous.

SUMMARY OF THE INVENTION

It is desirable to provide an image processing device capable of correcting a pseudo color generated when a plurality of images is synthesized so as to generate a synthesized image so as to generate a high-quality image, an imaging apparatus, an image processing method and a program.

According to an embodiment of the present invention, there is provided an image processing device including an image correction unit which receives a synthesized image generated by synthesizing a plurality of images and pseudo color pixel information indicating a pseudo color pixel position included in the synthesized image and executes pixel value correction using a pseudo color pixel in the synthesized image as a pixel to be corrected, wherein the image correction unit selects non-pseudo color pixels, which are not determined as a pseudo color based on the pseudo color pixel information, as reference pixels, from a reference region set in a peripheral region of the pixel to be corrected, sets a similarity weight coefficient in which a large weight is set as a pixel value of the reference pixel is close to a pixel value of the pixel to be corrected and a pixel position weight coefficient in which a large weight is set as the pixel value of the reference pixel is near a pixel position of the pixel to be corrected, with respect to the reference pixels, and determines a correction pixel value of the pixel to be corrected by a weighted summation process of summing values obtained by multiplying the pixel values of the reference pixels by the similarity weight coefficient and the pixel position weight coefficient.

In the image processing device of the embodiment of the present invention, the image correction unit may calculate the similarity weight coefficient according to a difference in pixel value configuration information of the pixels of the synthesized image.

In the image processing device of the embodiment of the present invention, pixel value information corresponding to a Lab color space may be set in each of the pixels of the synthesized image, and the image correction unit may calculate the similarity weight coefficient according to the difference in each of luminance L and a color difference ab, both of which are pixel value configuration information of the pixels of the synthesized image.

The image processing device of the embodiment of the present invention may further include a reduced image generation unit which executes a process of reducing the synthetic image, and the image correction unit may set the reference region in the reduced image generated by the reduced image generation unit, and apply a reference pixel selected from the reference region set in the reduced image so as to calculate the similarity weight coefficient and the pixel position weight coefficient.

In the image processing device of the embodiment of the present invention, a second synthesized image based on an image photographed at a timing different from a first synthesized image including the pixel to be corrected or a reduced image of the second synthesized image may be received as a second reference image, a second reference region may be set with respect to the second reference image in the vicinity of the pixel position corresponding to the pixel to be corrected of the first synthesized image, non-pseudo color pixels included in the second reference region are selected as reference pixels, the similarity weight coefficient and the pixel position weight coefficient may be set with respect to the selected reference pixels, and both the reference pixels selected from the synthesized image including the pixel to be corrected and the reference pixels selected from the second reference region may be applied so as to determine the correction pixel value of the pixel to be corrected by a weighted summation process of summing values obtained by multiplying the pixel values of the reference pixels by the similarity weight coefficient and the pixel position weight coefficient.

In the image processing device of the embodiment of the present invention, the image correction unit may calculate the similarity weight coefficient and the pixel position weight coefficient by applying a Gaussian function.

The image processing device of the embodiment of the present invention may further include an image analysis unit which receives the synthesized image and executes detection of the pseudo color pixel included in the synthesized image so as to generate the pseudo color pixel information, and the image correction unit may apply the pseudo color pixel information generated by the image analysis unit so as to perform the selection of the non-pseudo color pixels in the reference region.

The image processing device of the embodiment of the present invention may further include a synthesized image generation unit which synthesizes the plurality of images so as to generate the synthesized image, and the image correction unit may execute the correction of the synthesized image generated by the synthesized image generation unit.

In the image processing device of the embodiment of the present invention, the synthesized image may be generated by synthesizing the plurality of images photographed by setting different exposure times.

According to another embodiment of the present invention, there is an imaging apparatus including an imaging device which photographs captured images of different exposure times and the image processing unit which executes the image processing.

According to another embodiment of the present invention, there is an image processing method which executes pixel value correction in an image processing device, the image processing method including the steps of: at an image correction unit, receiving a synthesized image generated by synthesizing a plurality of images and pseudo color pixel information indicating a pseudo color pixel position included in the synthesized image and executing the pixel value correction using a pseudo color pixel in the synthesized image as a pixel to be corrected, wherein the step of correcting the image includes selecting non-pseudo color pixels, which are not determined as a pseudo color based on the pseudo color pixel information, as reference pixels, from a reference region set in a surrounding region of the pixel to be corrected, setting a similarity weight coefficient in which a large weight is set as a pixel value of the reference pixel is close to a pixel value of the pixel to be corrected and a pixel position weight coefficient in which a large weight is set as the pixel value of the reference pixel is near a pixel position of the pixel to be corrected, with respect to the reference pixels, and determining a correction pixel value of the pixel to be corrected by a weighted summation process of summing values obtained by multiplying the pixel values of the reference pixels by the similarity weight coefficient and the pixel position weight coefficient.

According to another embodiment of the present invention, there is provided a program which executes pixel value correction in an image processing device, the program including the steps of: at an image correction unit, receiving a synthesized image generated by synthesizing a plurality of images and pseudo color pixel information indicating a pseudo color pixel position included in the synthesized image and executing the pixel value correction using a pseudo color pixel in the synthesized image as a pixel to be corrected, wherein the step of correcting the image includes selecting non-pseudo color pixels, which are not determined as a pseudo color based on the pseudo color pixel information, as reference pixels, from a reference region set in a surrounding region of the pixel to be corrected, setting a similarity weight coefficient in which a large weight is set as a pixel value of the reference pixel is close to a pixel value of the pixel to be corrected and a pixel position weight coefficient in which a large weight is set as the pixel value of the reference pixel is near a pixel position of the pixel to be corrected, with respect to the reference pixels, and determining a correction pixel value of the pixel to be corrected by a weighted summation process of summing values obtained by multiplying the pixel values of the reference pixels by the similarity weight coefficient and the pixel position weight coefficient.

In addition, the program according to the embodiment of the present invention is, for example, a program which may be provided to an information processing device or a computer system for executing various program codes, by a storage medium or a communication medium provided in a computer-readable format. By providing such a program in the computer-readable format, a process according to the program is realized on the information processing device or the computer system.

The other objects, features and advantages of the present invention will be apparent from the more detailed description based on the below-described embodiments of the present invention or the accompanying drawings. In the present specification, the system is a logical set of a plurality of devices and is not limited to that system in which the devices having the respective configurations are included in the same apparatus.

According to the configuration of one embodiment of the present invention, a device and method for performing the process of correcting the pseudo color in the synthesized image generated by synthesizing the plurality of images is realized. In detail, the reference region is set in the vicinity of the pseudo color pixel included in the synthesized image obtained by selectively combining the pixel values of the plurality of images and the non-pseudo color pixels are selected from the reference region as the reference pixels. In addition, with respect to the reference pixels, the similarity weight coefficient in which a large weight is set as the pixel value of the reference pixel is close to the pixel value of the pseudo color pixel which is the pixel to be corrected and the pixel position weight coefficient in which a large weight is set as the pixel value of the reference pixel is near the pixel position of the pixel to be corrected are set, and the pixel value of the pixel to be corrected is determined by the weighted summation process of summing the values obtained by multiplying the pixel values of the reference pixels by the similarity weight coefficient and the pixel position weight coefficient. By this pixel value correction process, it is possible to correct the pseudo color pixel to be close to the true pixel value.

BRIEF DESCRIPTION OF THE DRAWINGS

FIG. 2 is a diagram illustrating an overall configuration example of an image processing device according to an embodiment of the present invention;

FIGS. 3A to 3C are diagrams illustrating examples of a pixel value correction process according to an embodiment of the present invention;

FIG. 5 is a diagram illustrating an example of a pseudo color determination image generated by an image analysis unit;

FIG. 7 is a diagram illustrating a Gaussian function used for setting a weight coefficient of a reference pixel;

FIG. 8 is a diagram illustrating an example of a pixel value correction process of an embodiment of the present invention;

FIGS. 13A1 and 13A2 are diagrams illustrating examples of a process of reducing a general image;

FIGS. 14B1 and 14B2 are diagrams illustrating examples of a process of reducing an image, in which influence of a pseudo color is reduced, in consideration of a pseudo color pixel.

DESCRIPTION OF THE PREFERRED EMBODIMENTS

Hereinafter, an image processing device, an imaging apparatus, an image processing method and a program according to the embodiments of the present invention will be described with reference to the drawings.

The description will be given in the following order.
1. Regarding Overall Configuration Example of Image Processing Device
2. Regarding Detailed Embodiment of Image Processing Device
  2-1. Embodiment 1
  2-2. Embodiment 2
  2-3. Embodiment 3
3. Regarding Example of Process of Generating Reduced Image
4. Regarding Example of Process of Applying Different Color Spaces
5. Regarding Other Modified Embodiment
  5-1. Modified Example of Process of Calculating Weight Coefficient
  5-2. Example of Process of Correcting Luminance Value
  5-3. Process of Applying Blurring Process to Corrected Image 1. Regarding Overall Configuration Example of Image Processing Device First, the overall configuration example of an image processing device according to an embodiment of the present invention will be described with reference to FIG. 2.

Figures 1, 13A:
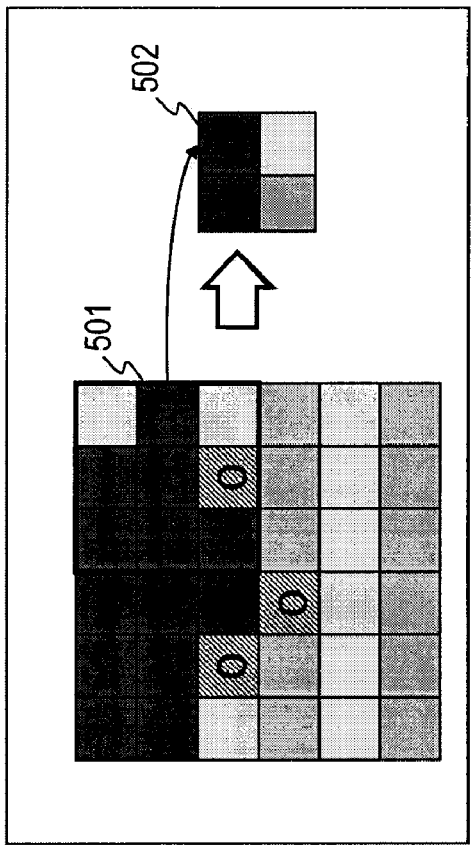
Figures 2, 13A:
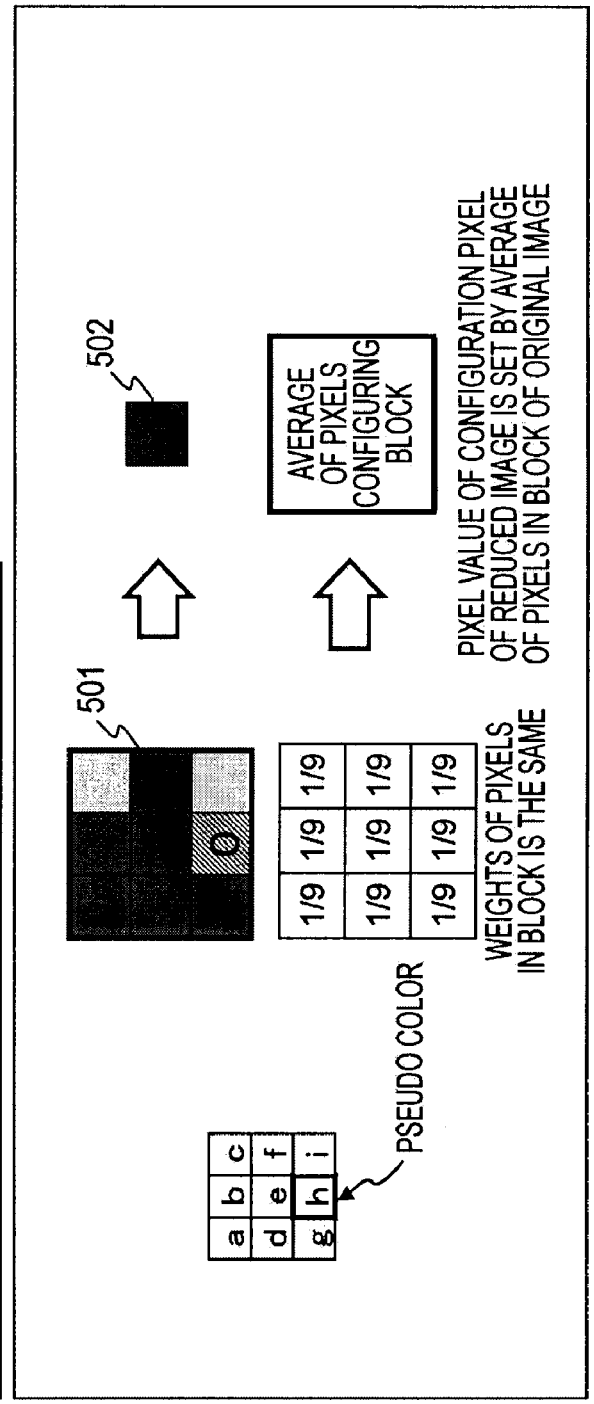

FIG. 2 is a block diagram illustrating a configuration example of an imaging apparatus which is an example of an image processing device according to an embodiment of the present invention. Light incident through an optical lens 101 enters into an imaging device 102 including, for example, a CMOS image sensor or the like so as to output image data by photoelectric conversion. The output image data is input to an image processing unit 104 through a memory 103. A controller 105, for example, outputs a control signal to each unit according to a program stored in a memory (not shown) so as to control various processes.

The imaging device 102 generates a plurality of images 111 to 113. For example, images having an overlapping region or the plurality of images 111 to 113 having different exposure times are generated. The image processing unit 104 receives the plurality of images 111 to 113, performs a synthesis process, and generates an output image 120. The image processing unit 104 executes correction of a pseudo color region generated at the time of the synthesis process of the plurality of images and generates the output image 120.

For example, if the images 111 to 113 are images having different exposure times, the image processing unit 104 receives, for example, the following images.
Image 1 (exposure time T1) 111
Image 2 (exposure time T2) 112
:
Image N (exposure time TN)
Here, $T1 < T2 \ldots < TN$.

The image processing unit 104 receives the N images having different exposure times T1 to TN from the imaging device 102 and generates the output image 120 based on the plurality of images having the different exposure times.

As described above, the electric signal output from the imaging device is generated according to an incident light amount of the imaging device. Accordingly, in a certain exposure time (long-time exposure), an electric signal output from a photoelectric conversion element of a pixel corresponding to a brighter subject may reach a saturation level. As a result, in this pixel, an electric signal of the saturation level is output. Thus, this pixel becomes a so-called whitening-out pixel in which a grayscale difference is not recognized.

For example, in order to prevent whitening-out and obtain an output with a luminance level of a subject, plural pieces of image data of long-time exposure to short-time exposure is generated, and the synthesis process of the plurality of images is executed in the image processing unit 104 so as to obtain the output image 120. For example, with respect to a pixel which is predicted to reach the saturation level when the long-time exposure is performed, a process of outputting a pixel value calculated based on data for performing short-time exposure is performed.

In addition, a process of acquiring a plurality of images having different exposure times is disclosed in Japanese Unexamined Patent Application Publication No. 2008-99158 or Japanese Unexamined Patent Application Publication No. 2008-227697 by the same applicant as the present applicant.

The present invention relates to, for example, a configuration for correcting a pseudo color which is prone to be generated in an image synthesis process of synthesizing a plurality of images such as a plurality of images having different exposure times so as to generate one image.

As described above, the plurality of images having the different exposure amounts become images photographed at different timings. Accordingly, for example, if the subject is moved during photographing, a deviation in image is generated at the time of image synthesis. As a result, a pseudo color is generated in an image region of the moving subject region and thus image quality deteriorates.

In addition, the pseudo color is generated by various factors such as a variation in photographing condition, for example, a variation in brightness, as well as the movement of the subject.

The image processing unit 104 analyzes the image received from the imaging device 102 and executes a correction process of the detected pseudo color pixel. Hereinafter, a plurality of detailed embodiments of the pseudo color correction process will be described.

2. Regarding Detailed Embodiment of Image Processing Device

The image processing device according to the embodiment of the present invention executes, for example, a process of correcting a pseudo color generated in a synthesized image generated by synthesizing a plurality of images photographed at different timings, such as a plurality of photographed images having different exposure times. The basic process of the pixel value correction executed in the image processing device according to the embodiment of the present invention is a process of setting pixel values of neighboring pixels of a pseudo color pixel to be corrected as reference pixels and determining the pixel value of the pseudo color pixel to be corrected using the pixel values of the reference pixels.

In the image processing device according to the embodiment of the present invention, the luminance of the pixel (pseudo color pixel) to be corrected is verified, and the weights of the neighboring pixels having luminance close to the luminance of the pixel to be corrected are set large so as to perform a pixel value determination process of the pixel to be corrected. Hereinafter, a plurality of detailed embodiments of the image processing device for performing a correction process of a pseudo color region will be described. In addition, in the following embodiments, the overall configuration of the image processing devices commonly have the configuration shown in FIG. 2. However, the following embodiments are different in the detailed configuration and the process of the image processing unit 104. The details thereof will now be sequentially described.

2-1. Embodiment 1

First, the configuration and the process of the image processing device of Embodiment 1 of the present invention will be described with reference to FIG. 3 and the subsequent drawings thereof. As described above, the image processing device according to the embodiment of the present invention performs a pixel value correction process of focusing attention on the luminance level of the pseudo color pixel to be corrected at the time of correction of the pseudo color pixel, verifying the luminance of each pixel of a predefined reference region of a neighboring region of the pixel to be corrected, setting the weights of the neighboring pixels having the luminance close to the luminance of the pixel to be corrected as pixels having a high degree of importance to be large, and setting the pixel value of the pixel to be corrected based on the pixel value in the vicinity of the reference region.

For example, the pixel position on an XY coordinate plane is set to (x, y). In addition, a process example using a Lab color space as an example of a color space will be described.

The luminance L and a color difference a, b of the pixel located on the pixel position (x, y) are expressed as following.

Luminance L is $D_L(x, y)$.

Color difference a, b is $D_{a,b}(x, y)$.

Here, $D_{a,b}(x, y) = D_a(x, y)$ and $D_b(x, y)$.

In the image processing device according to the embodiment of the present invention, the luminance $D_L$ as the signal level of the pixel to be corrected (pseudo color pixel) is acquired, the luminance of the neighboring pixels of the pixel to be corrected (pseudo color pixel) are verified, and a pixel having the luminance close to the luminance $D_L$ of the pixel to be corrected (pseudo color pixel) is searched for from the neighboring pixels. The pixel having the close luminance is a pixel having a high degree of importance, the weights of the color difference $D_{a,b}$ of these pixels is set large, and the pixel value of the pixel to be corrected (pseudo color pixel) is determined so as to perform correction.

In this process, since not only the pseudo color pixel to be corrected may be corrected to be closer to a true pixel value but a pixel which is erroneously determined as a pseudo color pixel in the moving subject also uses a pixel value of a neighboring pixel of a neighboring signal level, it is possible to obtain a more natural image and adverse effects are reduced.

The reason will be described with reference to FIGS. 3A to 3C.

FIGS. 3A to 3C are graphs in which a horizontal axis denotes a pixel position and a vertical axis denotes color difference components $D_{a,b}$ before correction in FIG. 3A, denotes a luminance value $D_L$ before correction in FIG. 3B, and denotes color difference components $D_{a,b}$ after correction in FIG. 3C.

Among pixel positions a range of p to q to a range of r to s of the horizontal axis, a pixel portion in which a pseudo color is generated are a pixel portion q to r. In the pixel portion q to r, as shown in FIG. 3A, the color difference components $D_{a,b}$ do not have continuity with the neighboring portion p to q or r to s and are broken. That is, it is estimated that the pseudo color is generated.

However, even in the pixel portion q to r which is estimated as the pseudo color generation pixel position, as shown in FIG. 3B, another signal level such as a luminance value $D_L$ has continuity with the neighboring portion r to s and thus it is estimated that a correct luminance is set.

The pseudo color generation pixel does not have a correct value with respect to the color component (the color difference components $D_{a,b}$, in the present embodiment), but has a correct value with respect to the luminance component (the luminance value $D_L$, in the present embodiment).

Using these characteristics, as shown in FIG. 3C, a pixel value correction for approximating the signal values of the color components (the color difference components $D_{a,b}$, in the present embodiment) of the pseudo color pixel q to r to the signal values of the color components (the color difference components $D_{a,b}$, in the present embodiment) of the neighboring pixel r to s having the luminance component close to the luminance component (the luminance value $D_L$, in the present embodiment) of the pseudo color pixel q to r is executed.

The reason why such a process is valid will be described using the case where a plurality of images having different exposure times is synthesized so as to generate one synthesized image (an image with a wide dynamic range) as an example.

In FIGS. 3A to 3C, the horizontal axis denotes the pixel position. The pixel range in which the pseudo color is generated is the section q to r.

The pseudo color is prone to be generated in the synthesis process, for example, when the section p to q is a pixel region selected from an image 1, the section q to r is an image region selected from an image 2 different from the image 1, and the section r to s is an image region selected from an image 3 different from the images 1 and 2.

When the synthesized image is generated by the synthesis of different images, a process of adjusting the luminance levels of the images based on the exposure times of the images is performed. Accordingly, the luminance level is smoothly adjusted over the overall synthesized image. However, color information may be considered at the time of luminance adjustment. Accordingly, as shown in FIG. 3A, the color difference components $D_{a,b}$ are broken. In contrast, as shown in FIG. 3B, since the luminance value $D_L$ is subjected to an adjustment process between images, it is possible to obtain high-accuracy information. Accordingly, by adjusting the color information, for example, the color difference ab in the Lab color space using this luminance information, the correction process shown in FIG. 3C is performed. That is, it is possible to restore the color (color difference) of the pseudo color region by applying the color (color difference) of the neighboring pixel region having the luminance close to the luminance value of the pseudo color region.

In this process, since not only the pixel to be corrected may be corrected to be closer to a true pixel value but also, even in a pixel which is erroneously determined as a pseudo color pixel in the moving subject, the value of the luminance $D_L$ of the surrounding area is corrected using the color difference $D_{a,b}$ of the neighboring pixel, it is possible to obtain a more natural image and adverse effects such as a sense of incongruity caused as a result of the correction is reduced.

Figure 4:
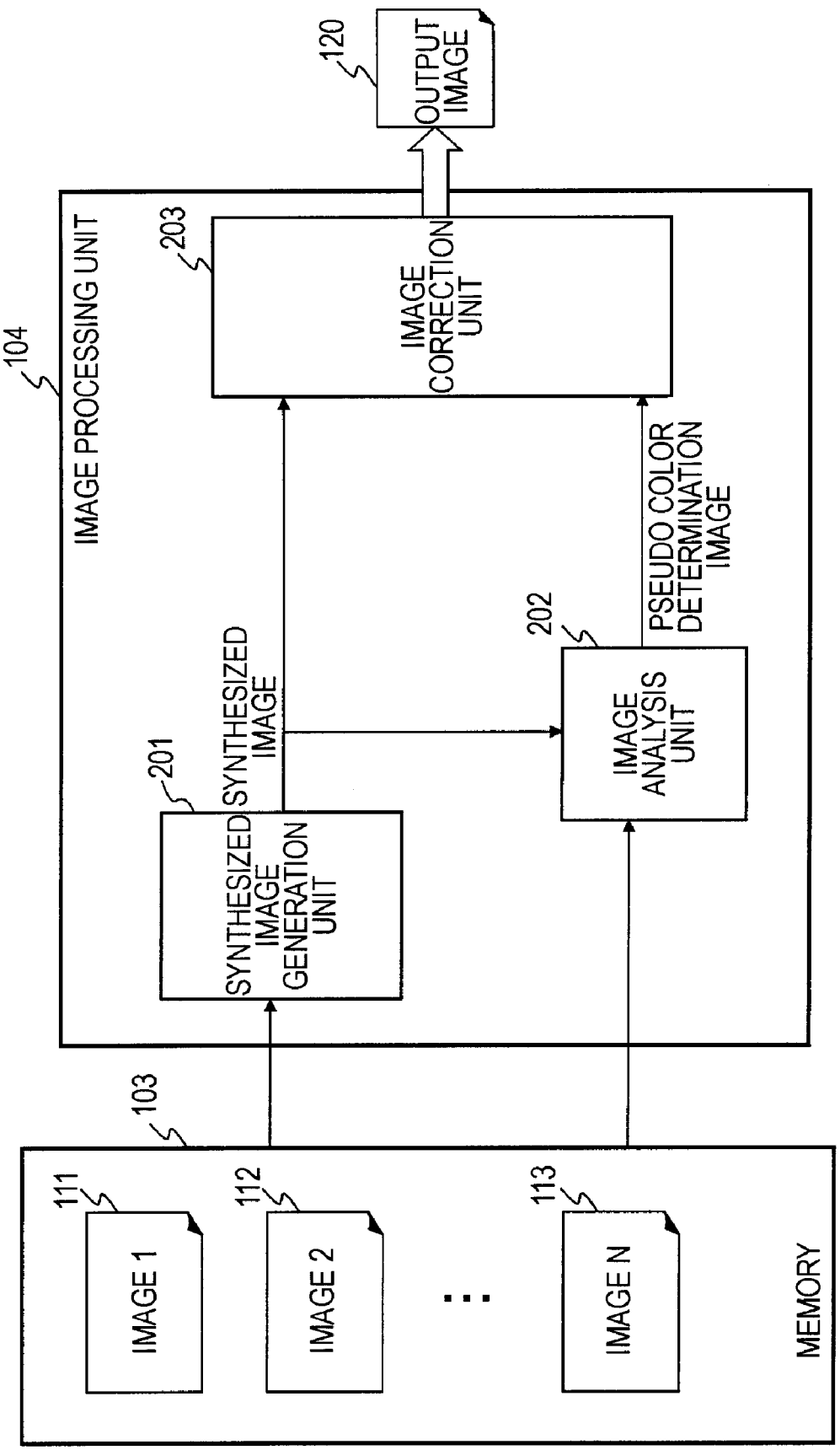
FIG. 4 is a diagram illustrating the configuration and the process of an image processing unit 104 of an image processing device according to Embodiment 1 of the present invention.

The configuration example of the image processing unit 104 of the image processing device according to the embodiment of the present invention is shown in FIG. 4. As shown in FIG. 4, the image processing unit 104 has a synthesized image generation unit 201, an image analysis unit 202 and an image correction unit 203.

The synthesized image generation unit 201 executes a process of synthesizing the plurality of images so as to generate the synthesized image. The image analysis unit 202 generates a pseudo color determination image by the image analysis. The image correction unit 203 receives the synthesized image and the pseudo color determination image, executes the process of correcting the pseudo color region of the synthesized image, and generates and outputs the output image 120.

The image processing unit 104 of the image processing device according to the embodiment of the present invention executes the process of synthesizing the plurality of images so as to generate the synthesized image and correcting the pseudo color region generated in the generated synthesized image.

The synthesized image generation unit 201 first, for example, receives images having an overlapping region or the plurality of images having different exposure times, for example, the images 111 to 113 shown in FIG. 2 and performs the synthesis process, as described with reference to FIGS. 1 and 2. For example, if the images 111 to 113 are the images having different exposure times, the synthesized image generation unit 201 of the image processing unit 104 receives, for example, the following images.

Image 1 (exposure time T1) 111
Image 2 (exposure time T2) 112
:
Image N (exposure time TN)
Here, T1<T2< . . . <TN.

The synthesized image generation unit 201 receives the N images having different exposure times T1 to TN from the imaging device 102 shown in FIG. 2 and generates the synthesized image based on the plurality of images having the different exposure times.

As described above, the plurality of images having the different exposure amounts becomes images photographed at different timings. Accordingly, for example, if the subject is moved during photographing, a deviation in image is generated at the time of image synthesis. As a result, a pseudo color is generated in an image region of the moving subject region and thus image quality deteriorates. In addition, the pseudo color is generated by various factors such as a variation in photographing condition, for example, a variation in brightness, as well as the movement of the subject.

The image analysis unit 202 of the image processing unit 104 shown in FIG. 4 generates the pseudo color determination image for determining the pseudo color pixel region by the image analysis of the synthesized image. The pseudo color determination image is, for example, an image in which an identification value (for example, a flag) indicating whether or not it is estimated that each of the pixels configuring the synthesized image is a pseudo color pixel is set. In detail, for example, as shown in FIG. 5, the pseudo color determination image is the image in which the identification information of the pixel is set such that the identification flag is set to 0 with respect to the pixel which is estimated to be the pseudo color and the identification flag is set to 1 with respect to the pixel which is not estimated to be the pseudo color.

The image analysis unit 202 performs the process of executing the image analysis of the synthesized image and detecting the pseudo color pixel. As the process of detecting the pseudo color region, various existing processes are applicable. In addition, a process of determining that a movement region detected by a movement region detection process in a synthesized image is a pseudo color pixel region, which is disclosed in Japanese Patent Application Publication No. 2009-288018 filed by the present applicant, is applicable as a valid method.

In the movement region detection process in the synthesized image disclosed in Japanese Patent Application Publication No. 2009-288018, detection of the movement region by a comparison process (matching process) or the like of correspondence pixel values of a synthesized image of a photographing time T1 and a synthesized image of a time T2 is performed. A possibility that a pseudo color is generated in such a movement region is high. A configuration for detecting the pseudo color pixel region by applying the process of detecting such a movement region may be used. Since the subject matter of the present invention is the process of correcting the pseudo color pixel, the process of detecting the pseudo color pixel may use various existing methods.

The image correction unit 203 of the image processing unit 104 shown in FIG. 4 receives the synthesized image generated by the synthesized image generation unit 201 and the pseudo color determination image generated by the image analysis unit 202, executes the process of correcting the pseudo color region of the synthesized image, and generates and outputs the output image 120.

The process of correcting the pseudo color pixel, which is executed by the image correction unit 203, will be described.

The image correction unit 203 first sets a reference region in the vicinity of the pseudo color pixel to be corrected. The reference region is, for example, an n×n pixel region centered on the pseudo color pixel to be corrected. n may be variously set to, for example, 3 to 10.

Next, the image correction unit 203 detects non-pseudo color pixels and pixels having luminance values close to the luminance of the pseudo color pixel to be corrected from the reference region set in the vicinity of the pseudo color pixel.

In addition, using the detected pixels as important pixels, a process of setting the weights of the important pixels of the reference region to be large and calculating the correction pixel value of the pseudo color pixel based on the pixel values of the pixels of the reference region is performed.

By this correction, it is possible to correct the pseudo color pixel to be close to a true pixel value.

An example of the process will be described in detail. As described above, the pixel position on the XY coordinate plane is set to (x, y). In addition, a process example using a Lab color space as an example of a color space will be described.

The luminance L and a color difference a, b of the pixel located on the pixel position (x, y) are expressed as following.
Luminance L is $D_L(x, y)$.
Color difference a, b is $D_{a,b}(x, y)$.

The color difference which is the color information of the pixels (pixel position (x, y)) to be corrected of the synthesized image is set to $D_{a,b}(x, y)$ and the color difference of the reference pixel (pixel position (x+i, y+j)) of the reference region in the vicinity of the pixel to be corrected of the synthesized image is set to $N_{a,b}(x, Y)$. Here, $D_{a,b}(x, y) = N_{a,b}(x, y)$.

The image correction unit 203 calculates the color difference $R_{ab}(x, y)$ which is color information after correction of the pixel (x, y) configuring the synthesized image according to Equation 1. In addition, with respect to the luminance $D_L(x, y)$, the set value of the input image is set to the luminance of the output image, without correction.

$$R_{a,b}(x, y) = \frac{\sum_{j=-t_y}^{t_y} \sum_{i=-t_x}^{t_x} E(i, j) C(x, y, i, j) P(x, y, i, j) N_{a,b}(x+i, x+j)}{\sum_{j=-t_y}^{t_y} \sum_{i=-t_x}^{t_x} E(i, j)} \bar{E}(x, y) + E(x, y) D_{a,b}(x, y)$$

$$C(x, y, i, j) P(x, y, i, j)$$

$$\left( \text{if } \sum_{j=-t_y}^{t_y} \sum_{i=-t_x}^{t_x} E(i, j) = 0 \; R_{a,b}(x, y) = D_{a,b}(x, y) \right)$$

$$C(x, y, i, j) = \frac{1}{\sqrt{2\pi}\sigma_c} e^{-\frac{c(x,y,i,j)}{2\sigma_c^2}}$$

$$c(x, y, i, j) = \sqrt{(D_L(x, y) - N_L(x+i, y+j))^2 + (D_a(x, y) - N_a(x+i, y+j))^2 + (D_b(x, y) - N_b(x+i, y+j))^2}$$

$$P(x, y, i, j) = \frac{1}{\sqrt{2\pi}\sigma_p} e^{-\frac{\sqrt{(x-i)^2+(y-j)^2}}{2\sigma_p^2}}$$

Equation 1

In Equation 1, E(i, j) is a pseudo color determination image (see FIG. 5) in which 0 is output if the pixel (i, j) is a pseudo color and 1 is output if the pseudo color is not present. c(x, y, i, j) (data in which (–) is set on the upper portion of E outputs 1 if it is an inverse value of E(i, j), that is, a pseudo color, and outputs 0 if the pseudo color is not present) is ΔLab indicating a pixel value difference (distance) between the luminance $D_L(x, y)$ and the color difference $D_{a,b}(x, y)$, both of which are the pixel value configuration information of the pixel (x, y) in the Lab color space and the luminance $D_L(x+i, y+j)$ and the color difference $D_{a,b}(x+i, y+j)$, both of which are the pixel value configuration information of the reference pixel (x+i, y+j).

C(x, y, i, j) is a Gaussian function of c(x, y, i, j). For example, it is the result f(ΔLab) of converting c(x, y, j)=ΔLab according to a Gauss curved line shown in FIG. 6.

Figure 6:
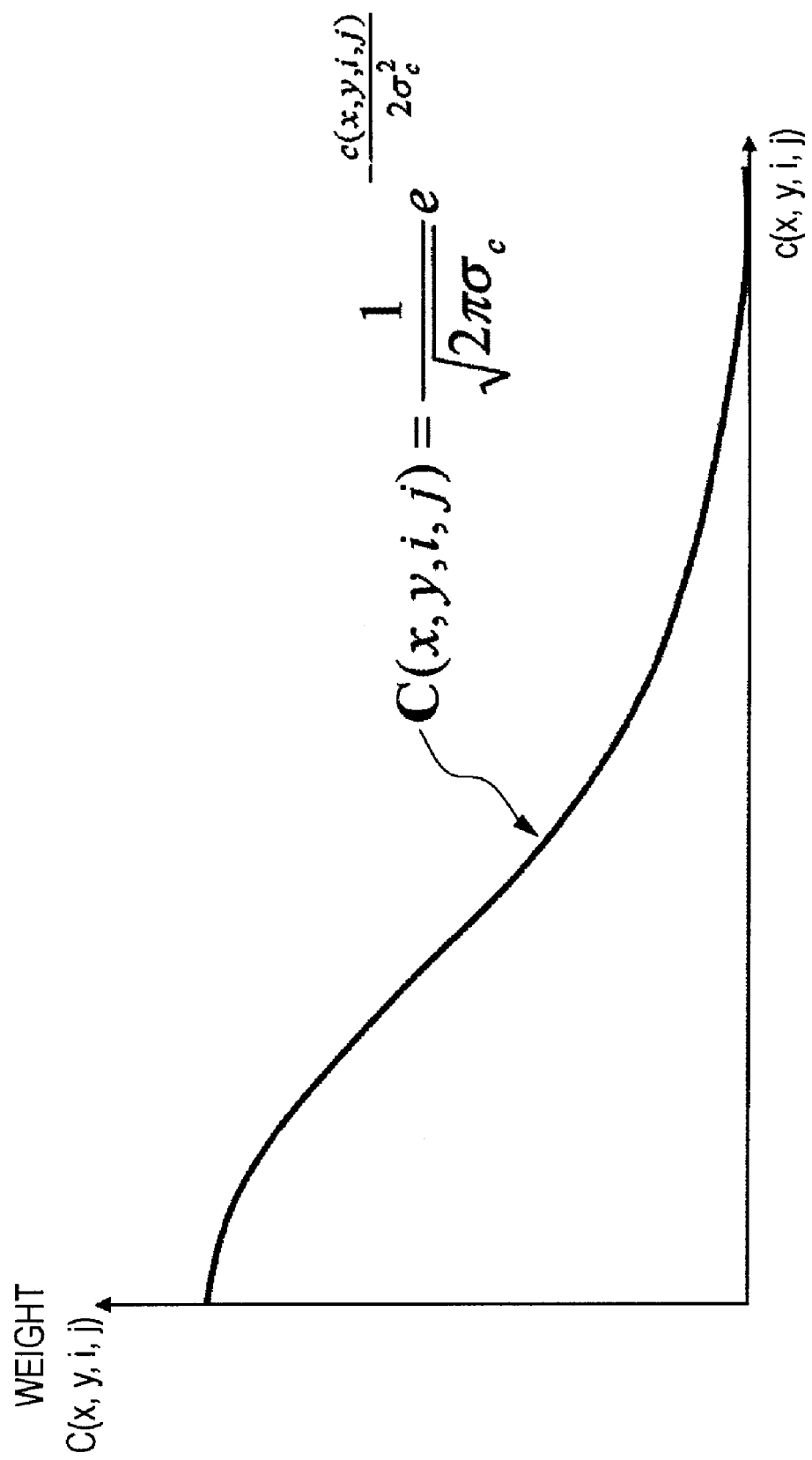
FIG. 6 is a diagram illustrating a Gaussian function used for setting a weight coefficient of a reference pixel.

FIG. 6 is a diagram illustrating a Gaussian function used for setting a weight coefficient of a reference pixel.

P(x, y, i, j) is a Gaussian function of a spatial space between the pixel (x, y) and the pixel (x+i, y+j). For example, it is the result of converting the spatial space between the pixel (x, y) and the pixel (x+i, y+j) according to the Gauss curved line shown in FIG. 6.

In addition, σ included in each Gaussian function is a Gaussian parameter and t is the number of taps in the x and y directions. The Gaussian parameter is set large, correction is facilitated, but adverse effects are increased.

The image correction unit 203 calculates the color difference $R_{ab}(x, y)$ which is the color information of the output pixel after correction of the pixel (x, y) to be corrected of the synthesized image according to Equation 1.

In Equation 1, the process of setting the non-pseudo color pixels (the pixels set to 1 in the pseudo color determination image (see FIG. 5)) and the reference pixels having the pixel value Lab close to color difference $D_{a,b}(x, y)$ and $D_L(x, y)$, which is the pixel value configuration information of the pseudo color pixel to be corrected from the reference region set in the vicinity of the pseudo color pixel as important pixels, setting the weights of the important pixels to be large, setting the weights of the pixels near the pseudo color pixel to be corrected to be large, and calculating the correction pixel value of the pseudo color pixel based on the pixel values of the pixels of the reference region is performed.

In Equation 1, the weights according to the pixel values close to the pixel value configuration information Lab of the pseudo color pixel correspond to C(x, y, i, j) and the weights of the pixels according to the distance with the pseudo color pixel correspond to P(x, y, i, j).

That is, the weight coefficient according to pixel value similarity (similarity weight coefficient) is C(x, y, i, j) and the weight coefficient according to the distance between pixels (pixel position weight coefficient) is P(x, y, i, j). These weights become the weights according to the Gauss curved line shown in FIG. 7.

The image correction unit 203 sets the similarity weight coefficient in which a large weight is set as the pixel value of the reference pixel that is close to the pixel value of the pixel to be corrected and the pixel position weight coefficient in which a large weight is set as the pixel value of the reference pixel that is near the pixel position of the pixel to be corrected. The similarity weight coefficient is calculated according to a difference of each pixel value configuration information.

That is, a large weight is set with respect to a reference pixel having a pixel value (Lab) close to color difference $D_{a,b}(x, y)$ and $D_L(x, y)$, which are the pixel value configuration information of the pseudo color pixel to be corrected, a large weight is set with respect to a reference pixel near the pseudo color pixel to be corrected, the set weight is applied, and the color information (color difference $N_{ab}(x+i, y+j)$) of the plurality of pixels in the reference region is subjected to a weighted summation so as to determine the color value (color difference $D_{ab}(x, y)$) of the pixel (pseudo color pixel) to be corrected.

As described above, with respect to the luminance $D_L(x, y)$, the set value of the input image is set to the luminance of the output image, without correction.

The process of, at the image correction unit 203, calculating the color difference $R_{ab}(x, y)$ which is the color information of the output pixel after correction of the pixel (x, y) to be corrected of the synthesized image according to Equation 1 will be described with reference to FIGS. 8A and 8B.

FIG. 8A shows an image before correction of the pseudo color pixel 221 to be corrected and FIG. 8B shows an image after correction of the pseudo color pixel 221 to be corrected.

In the example shown in FIG. 8A, a 3×3 pixel region including the neighboring pixels of the pseudo color pixel 221a to be corrected is a reference region.

From the reference region shown in FIG. 8A, first, the non-pseudo color pixel (the pixel which is set to 1 in the pseudo color determination image (see FIG. 5)) is selected from the reference region shown in FIG. 8A.

In FIG. 8A, only the pseudo color pixel is set to 0. The pixels which are not set to 0 are non-pseudo color pixels.

In the reference region shown in FIG. 8A, the pseudo color pixel among the eight pixels of the reference region other than the pseudo color pixel 221a to be corrected is only a pixel 223.

Accordingly, from the eight pixels excluding the pseudo color pixel 221 to be corrected in the reference region shown in FIG. 8A, the pixel values of the seven pixels excluding the pseudo color pixel 223 become the reference pixels used to determine the pixel value (color difference $D_{ab}(x, y)$) of the pseudo color pixel 221.

The luminance $N_L(x+i, y+j)$ of the seven reference pixels and the color difference $N_{ab}(x+i, y+j)$ of the seven reference pixels are used in Equation 1.

i and j denote deviations between the coordinate positions of the pseudo color pixel 221a to be corrected and the reference pixel and N denotes a pixel number. In this case, since the seven pixels are used as the reference pixels, seven pieces of pixel information of N=1 to 7 are used.

Using the seven reference pixels as the reference pixels, the pixel value (color difference $D_{ab}(x, y)$) of the pseudo color pixel 221 is determined according to Equation 1.

The process of setting the weights of the reference pixels having the pixel values Lab close to color difference $D_{a,b}(x, y)$ and $D_L(x, y)$, which is the pixel value configuration information of the pseudo color pixel 221a to be corrected to be large, setting the weights of the reference pixels near the pseudo color pixel 221 to be large, and calculating the correction pixel value of the pseudo color pixel based on the pixel values of the pixels of the reference region is performed.

As a result, as shown in FIG. 8B, a correction result image in which the color difference of the pseudo color pixel 221 is corrected is generated. In the pixel 221b, the color difference $R_{ab}(x, y)$ calculated according to Equation 1 is set. In addition, the luminance $D_L(x, y)$ is equal to that at the time of input and is not changed.

In addition, the reference pixel region is not limited to 3×3 and may be variously set to 5×5, 7×7, or the like. The reference region depends on the number of taps of the filter for acquiring the pixel information. The reference region, that is, all the pixels in the taps, may be the pseudo color. However, in this case, it is preferable that the reference region is enlarged. Alternatively, the output process may be performed without the correction of the color difference at the time of the input.

In the above-described embodiment, the process executed by the image correction unit 203 of the image processing device is summarized as follows.

The image correction unit 203 first selects the non-pseudo color pixels which are not determined as the pseudo color based on the pseudo color pixel information generated by the image analysis unit 202 as the reference pixels, from the reference region set in the vicinity of the pixel to be corrected.

Next, the similarity weight coefficient in which a large weight is set as the pixel value of the reference pixel is close to the pixel value of the pixel to be corrected and the pixel position weight coefficient in which a large weight is set as the pixel value of the reference pixel is near the pixel position of the pixel to be corrected are set with respect to each reference pixel.

Next, with respect to the pixel value of each reference pixel, the correction pixel value of the pixel to be corrected is determined by the weighted summation process of multiplying and summing the similarity weight coefficient and the pixel position weight coefficient.

By executing such a process, it is possible to correct the pseudo color pixel to the pixel having an original right pixel value.

2-2. Embodiment 2

Next, the configuration and the process of the image processing device according to Embodiment 2 of the present invention will be described with reference to FIG. 9.

Embodiment 2 is an example of a process of generating a reduced image of a synthesized image and applying the reduced image so as to calculate a correction pixel value of a pseudo color pixel.

First, the outline of the process of the present embodiment will be described with reference to FIG. 9.

Figure 9A:
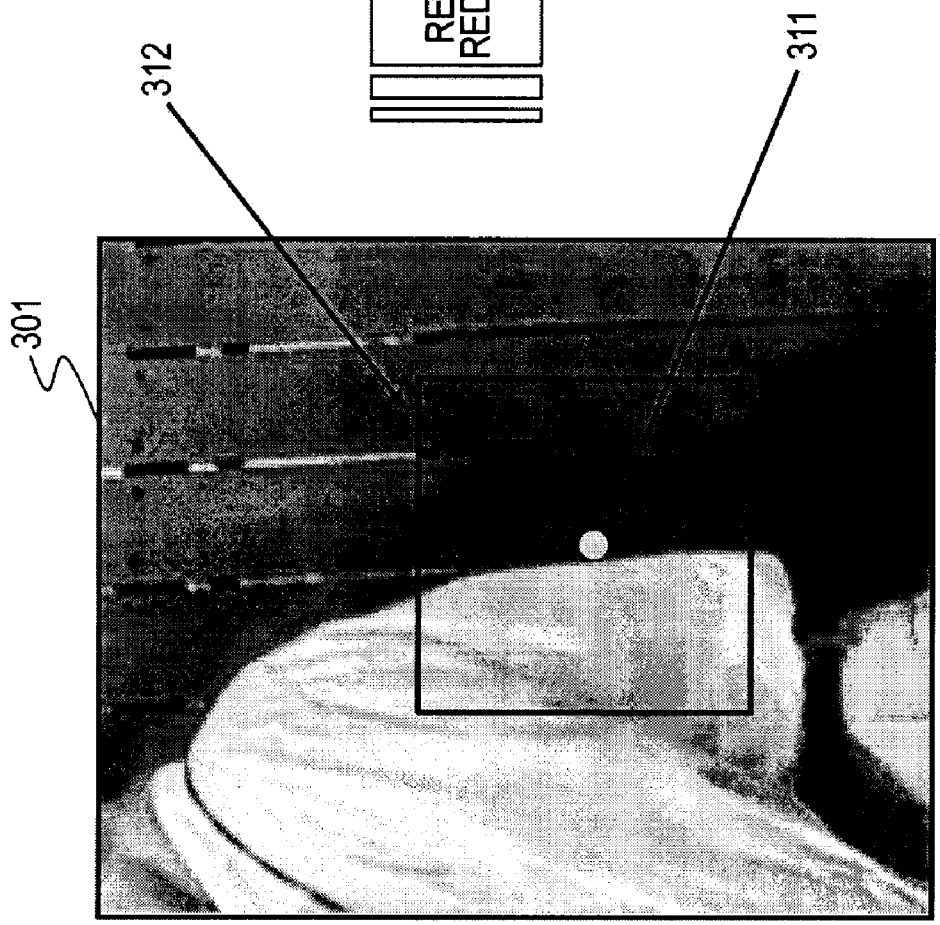
FIG. 9 is a diagram illustrating an example of a process using a reduction image generated by reducing a reference image applied to the pixel value correction process.

An image 301 shown in FIG. 9A is a synthesized image 301 including a pseudo color pixel to be corrected.

If a correction pixel value is calculated with respect to a pseudo color pixel 311 included in the synthetic image 301, for example, a process of setting a reference region a312 shown in FIG. 9A and acquiring a pseudo color determination result of a pixel included in the reference region a312 and a pixel value Lab is performed and a pixel value calculation process to which Equation 1 described in Embodiment 1 is applied is performed.

In this process, the processing amount and the calculation amount are increased according to the increase in the number of pixels included in the reference region a312.

Figure 9B:
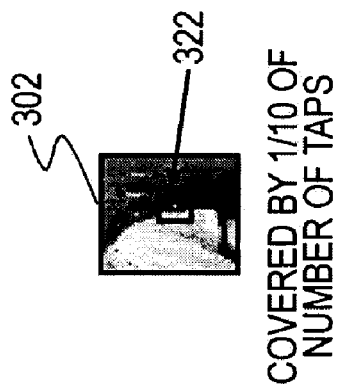

For example, as shown in FIG. 9B, if a reduced image 302 obtained by reducing the synthesized image 301 is generated and a reference region b322 is set in the vicinity of a pseudo color pixel of the reduced image 302 so as to perform processing, it is possible to reduce the number of pixels included in the reference region b322 as compared with the number of pixels included in the reference region a312 after reduction.

Accordingly, by performing the process of calculating the correction pixel value with respect to the reduced image, it is possible to reduce the processing amount and the calculation amount.

Similarly to Embodiment 1, the image processing device according to Embodiment 2 has the configuration shown in FIG. 2. The configuration of the image processing unit 104 is different from that of Embodiment 1. The configuration example of the image processing unit 104 according to Embodiment 2 is shown in FIG. 10.

Figure 10:
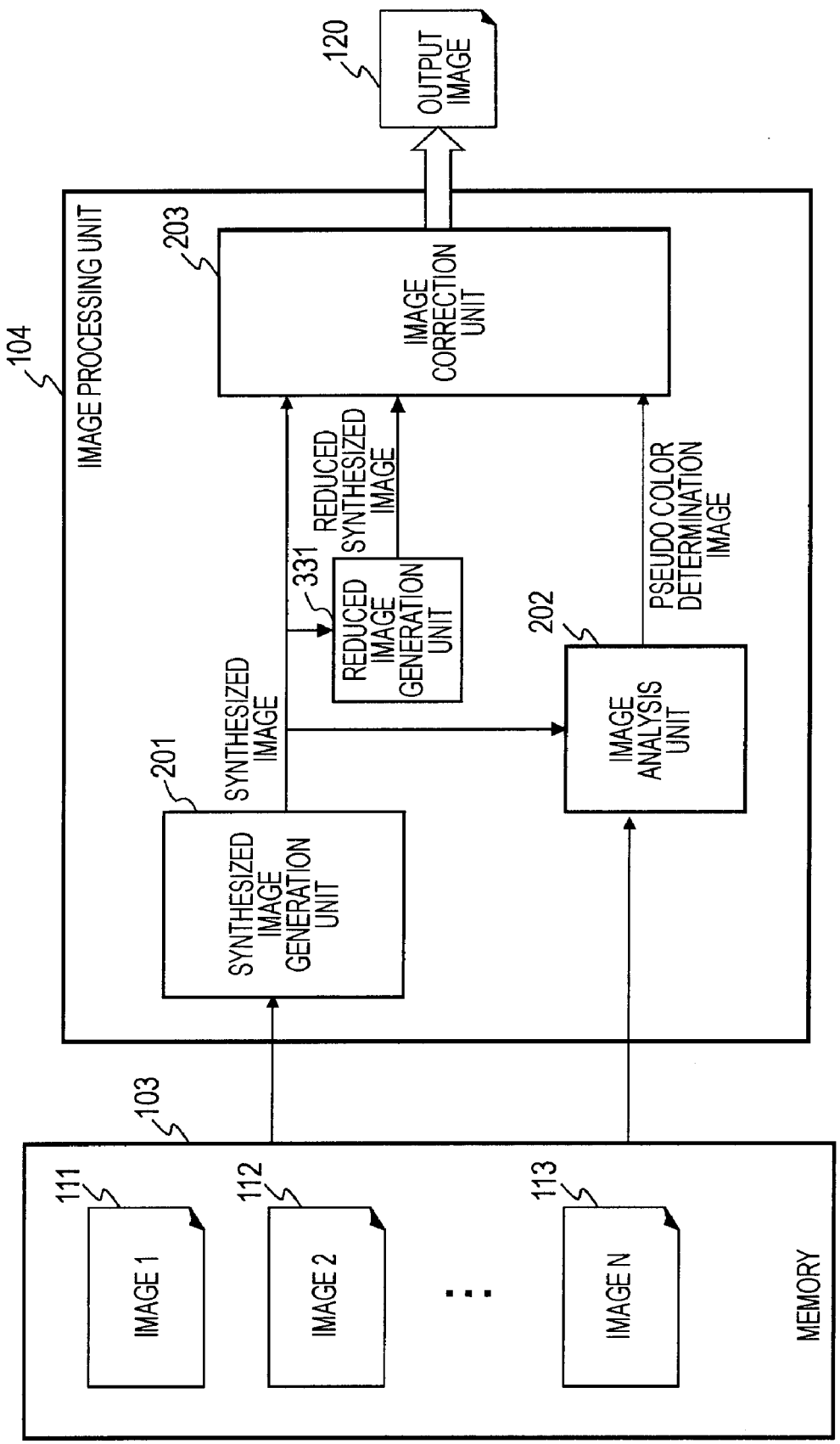
FIG. 10 is a diagram illustrating the configuration and the process of an image processing unit 104 of an image processing device according to Embodiment 2 of the present invention.

As shown in FIG. 10, the image processing unit 104 includes a reduced image generation unit 331, in addition to a synthesized image generation unit 201, an image analysis unit 202 and an image correction unit 203, all of which perform the same processing as Embodiment 1.

The synthesized image generation unit 201, the image analysis unit 202 and the image correction unit 203 basically have the same configuration as Embodiment 1 and execute the same processing. The image correction unit 203 executes a process of using the reduced image as well as the synthesized image.

The synthesized image generation unit 201 executes a process of synthesizing a plurality of images so as to generate the synthesized image.

The reduced image generation unit 331 executes a process of reducing the synthesized image generated by the synthesized image generation unit 201 so as to generate the reduced image.

The image analysis unit 202 generates a pseudo color determination image by the image analysis of the synthesized image. The pseudo color determination image is an image for distinguishing a pseudo color pixel and a non-pseudo color pixel described with reference to FIG. 5.

The image correction unit 203 receives the synthesized image, the reduced image and the pseudo color determination image, executes the process of correcting the pseudo color region of the synthesized image so as to generate the corrected synthesized image, and generates and outputs the output image 120.

The image correction unit 203 receives the reduced synthesized image based on the synthesized image and the pseudo color determination image corresponding to the synthesized image generated by the image analysis unit 202 and executes the process of correcting the pseudo color region of the synthesized image.

The basic processing mode of the process of correcting the pseudo color pixel, which is executed by the image correction unit 203, is equal to that of Embodiment 1. That is, a reference region is set in the vicinity of the pseudo color pixel to be corrected, and non-pseudo color pixels and pixels having luminance values close to the luminance of the pseudo color pixel to be corrected are detected from the set reference region.

In addition, using the detected pixels as important pixels, a process of setting the weights of the important pixels of the reference region to be large and calculating the correction pixel value of the pseudo color pixel based on the pixel values of the pixels of the reference region is performed.

In Embodiment 2, the image correction unit 203 performs the process by acquiring a weight coefficient (similarity weight coefficient) $C(x, y, i, j)$ according to similarity of the pixel value, a weight coefficient (pixel position weight coefficient) $P(x, y, i, j)$ according to a distance between pixels, and a color difference $N_{ab}(x+i, y+j)$ of the reference pixels in Equation 1 from the reduced image.

The example of the detailed process of correcting the pixel value, which is executed by the image correction unit 203 of the present embodiment, will be described.

The pixel position of the synthesized image before reduction is set to $(x, y)$ and the pixel position of the reduced synthesized image after reduction is set to $(X, Y)$. A reduction ratio of the reduced image to the synthesized image is "Q". For example, Q=10 if the reduced image is 1/10 of the synthesized image and Q=50 if the reduced image is 1/50 of the synthesized image.

In such setting, the pixel position $(X, Y)$ of the reduced synthesized image is defined by the following relationship equation using the pixel position $(x, y)$ of the synthesized image before reduction.

$$(X,Y)=(x/Q, y/Q)$$

Even in Embodiment 2, similarly to Embodiment 1, the image correction unit 203 performs the process of setting the weights of the reference pixels having the pixel values Lab close to $D_L(X, Y)$ and the color difference $D_{a,b}(x, y)$, both of which are the pixel value configuration information of the pseudo color pixel to be corrected to be large, setting the weights of the reference pixels near the pseudo color pixel to be large, and calculating the correction pixel value of the pseudo color pixel based on the pixel values of the pixels of the reference region.

The luminance L and the color difference a, b of the pixel located on the pixel position $(x, y)$ of the synthesized image are expressed as following.

Luminance L is $D_L(x, y)$.
Color difference a, b is $D_{a,b}(x, y)$.
Color difference which is the color information of the pixel (pixel position $(x, y)$) to be corrected of the synthesized image is $D_{a,b}(x, y)$.

Color difference of the reference pixel (pixel position $(x+i, y+j)$) of the reference region in the vicinity of the pixel to be corrected of the synthesized image is $N_{a,b}(x, y)$.

Here, $D_{a,b}(x, y) = N_{a,b}(x, y)$.

The image correction unit 203 calculates the color difference $R_{ab}(x, y)$ which is color information after correction of the pixel $(x, y)$ configuring the synthesized image according to Equation 2. In addition, with respect to the luminance $D_L(x, y)$, the set value of the input image is set to the luminance of the output image, without correction.

$$R_{a,b}(x, y) = \frac{\sum_{j=-t_y}^{t_y} \sum_{i=-t_x}^{t_x} C(X, Y, i, j) P(X, Y, i, j) N_{a,b}(X+i, Y+j)}{\sum_{j=-t_y}^{t_y} \sum_{i=-t_x}^{t_x} C(X, Y, i, j) P(X, Y, i, j)} \overline{E}(x, y) + E(x, y) D_{a,b}(x, y) \quad \text{Equation 2}$$

$$C(X, Y, i, j) = \frac{1}{\sqrt{2\pi}\sigma_c} e^{-\frac{c(X,Y,i,j)}{2\sigma_c^2}}$$

$$c(X, Y, i, j) = \sqrt{\begin{array}{l}(D_L(X, Y) - N_L(X+i, Y+j))^2 + \\ (D_a(X, Y) - N_a(X+i, Y+j))^2 + \\ (D_b(X, Y) - N_b(X+i, Y+j))^2\end{array}}$$

$$P(X, Y, i, j) = \frac{1}{\sqrt{2\pi}\sigma_p} e^{-\frac{\sqrt{(X-i)^2 + (Y-j)^2}}{2\sigma_p}}$$

In Equation 2, $E(i, j)$ is a pseudo color determination image (see FIG. 5) in which 0 is output if the pixel $(i, j)$ is a pseudo color and 1 is output if the pseudo value is not present. (data in which (−) is set on the upper portion of E outputs 1 if it is an inverse value of $E(i, j)$, that is, a pseudo value, and outputs 0 if it is not a pseudo value) $c(X, Y, i, j)$ is ΔLab indicating a pixel value difference (distance) between the luminance $D_L(x, y)$ and the color difference $D_{a,b}(x, y)$, both of which are the pixel value configuration information of the pixel $(x, y)$ in the Lab color space and the luminance $D_L(X+i, Y+j)$ and the color difference $D_{a,b}(X+i, Y+j)$, both of which are the pixel value configuration information of the reduced reference pixel $(X+i, Y+j)$.

$C(X, Y, i, j)$ is a Gaussian function (see FIGS. 6 and 7) of $c(X, Y, i, j)$.

$P(X, Y, i, j)$ is a Gaussian function (see FIGS. 6 and 7) of a spatial space between the pixel $(X, Y)$ located on the corresponding position of the pseudo color pixel $(x, y)$ set with respect to the reduced image and the pixel $(X+i, Y+j)$.

The image correction unit 203 calculates the color difference $R_{ab}(x, y)$ which is the color information of the output pixel after correction of the pixel $(x, y)$ to be corrected of the synthesized image according to Equation 2.

In Equation 2, similarly to Equation 1 applied to Embodiment 1, the process of setting the non-pseudo color pixels (the pixels set to 1 in the pseudo color determination image (see FIG. 5)) and the reference pixels having the pixel value Lab close to $D_L(x, y)$ and the color difference $D_{a,b}(x, y)$, both of which are the pixel value configuration information of the pseudo color pixel to be corrected from the reference region set in the vicinity of the pseudo color pixel as important pixels, setting the weights of the important pixels to be large, setting the weights of the pixels near the pseudo color pixel to be corrected to be large, and calculating the correction pixel value of the pseudo color pixel based on the pixel values of the pixels of the reference region is performed.

As described above, in Embodiment 2, the image correction unit 203 performs the process by acquiring the following parameters included in Equation 2, that is, a weight coefficient (similarity weight coefficient) C(X, Y, i, j) according to similarity of the pixel value, a weight coefficient (pixel position weight coefficient) P(X, Y, i j) according to a distance between pixels, and the color difference $N_{ab}(X+i, Y+j)$ of the reference pixels from the reduced image.

By acquiring the parameters from the reduced image, as described with reference to FIG. 9, it is possible to reduce the processing amount and the calculation amount so as to realize an efficient high-speed process. That is, by using the reduced image, even when the pseudo color is generated in a large area, it is possible to refer to a wide range of the neighboring pixels without increasing the number of taps for acquiring the data from the reference region, to markedly reduce the computation amount, and to reduce the circuit scale at the time of hardware manufacture.

2-3. Embodiment 3

Figure 11:
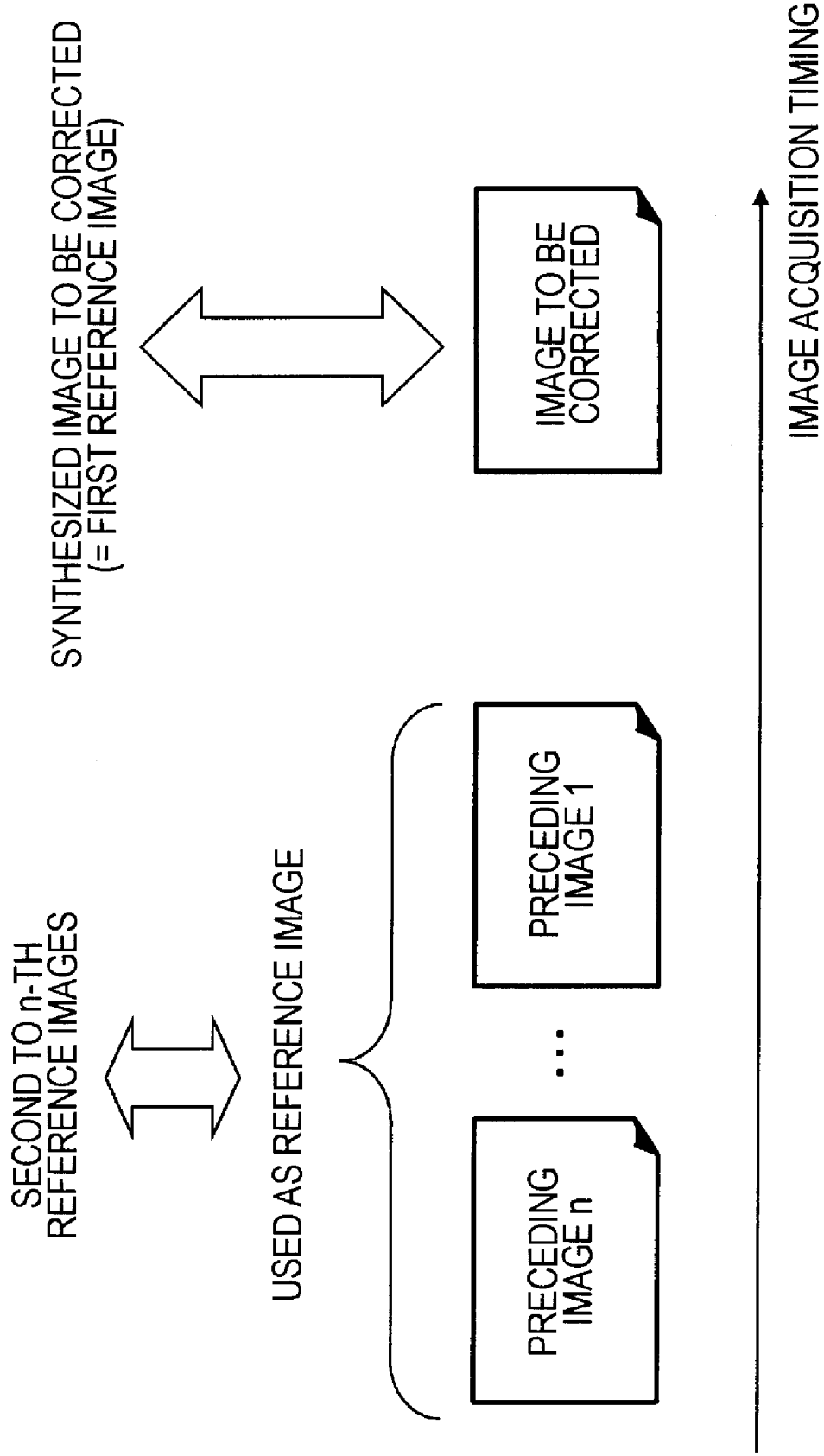
FIG. 11 is a diagram illustrating an example of a process of applying a photographed image of different timing at the time of pixel value correction.

Next, the configuration and the process of the image processing device according to Embodiment 3 of the present invention will be described with reference to FIG. 11.

In Embodiments 1 and 2, the number of synthesized images including the pseudo color pixel to be corrected or the number of reduced images thereof, which is used as an image for acquiring the reference pixels, was one. That is, the number of reference images was one.

Hereinafter, Embodiment 3 is an example of a process in which at least two reference images are applied. For example, a plurality of synthesized images such as a first synthesized image including a pseudo color pixel to be corrected and a second synthesized image based on an image photographed at timing different from that of the first synthesized image is set as reference images and a correction pixel value of the pseudo color pixel is calculated using reference pixel values acquired from a reference region set in the plurality of reference images. For example, as setting shown in FIG. 11, a correction value of a pseudo color of an image to be corrected is calculated using the plurality of reference images.

An example of setting the reference images for acquiring the reference pixels to two images (a) and (b) will be described.

Using two reference images: (a) the first reference image=the first synthesized image including the pseudo color image which is the pixel to be corrected and (b) the second reference image=the reduced image of the second synthesized image generated based on the preceding photographed image before the first synthesized image, an example of a process of calculating the correction values Ra, b(x, y) of the color difference $D_{a,b}(x, y)$ which are the color information as the pixel value configuration information of the pixel to be corrected will be described.

Similarly to Embodiments 1 to 2, the image processing device according to Embodiment 3 has the configuration shown in FIG. 2. The configuration of the image processing unit 104 is different from that of Embodiments 1 and 2. The configuration example of the image processing unit 104 according to Embodiment 3 is shown in FIG. 12.

Figure 12:
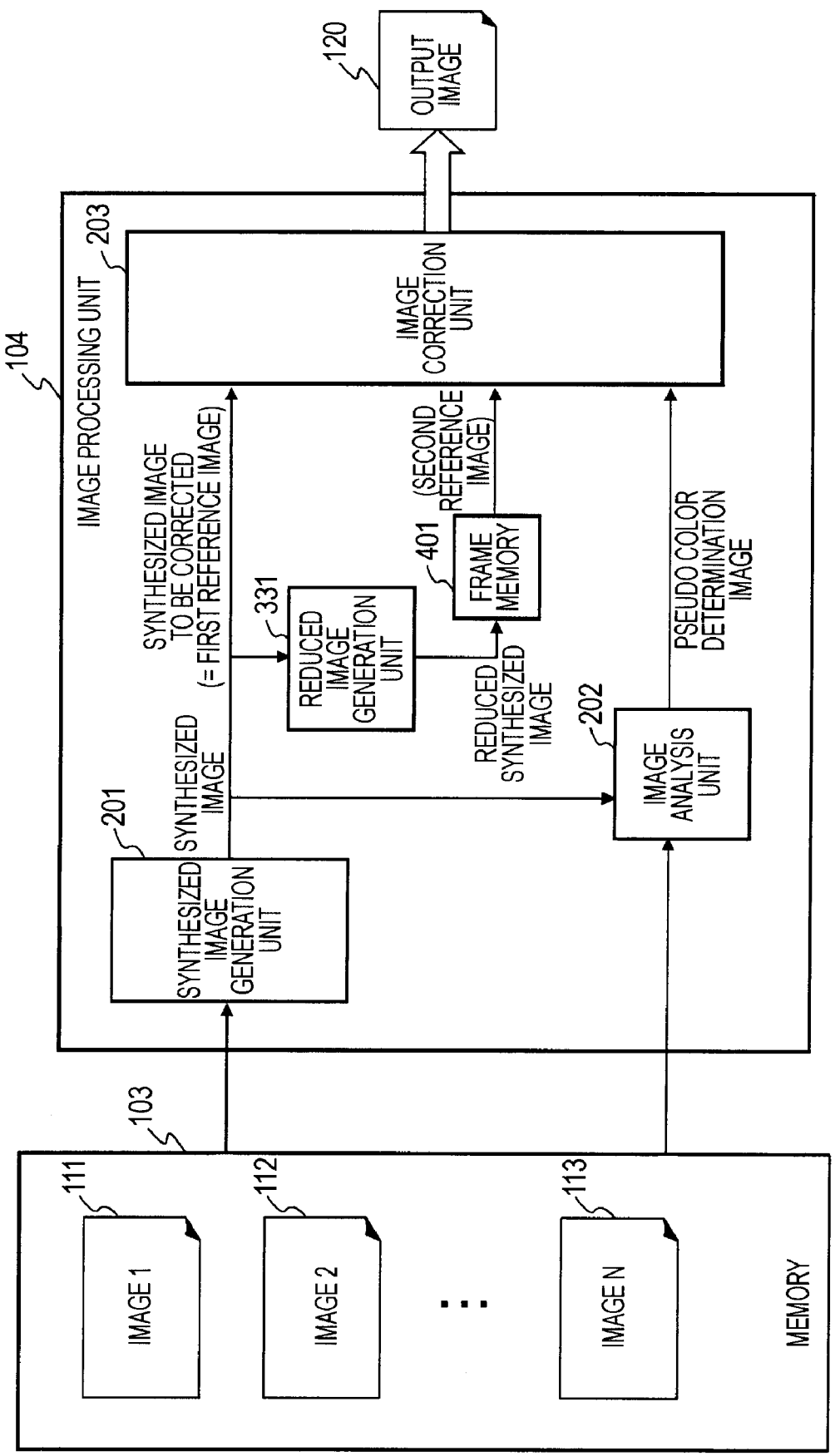
FIG. 12 is a diagram illustrating the configuration and the process of an image processing unit 104 of an image processing device according to Embodiment 3 of the present invention.

As shown in FIG. 12, the image processing unit 104 includes a frame memory 401 for temporarily storing a reduced image in addition to a synthesized image generation unit 201, an image analysis unit 202 and an image correction unit 203, all of which perform the same processing as Embodiment 1, and a reduced image generation unit 331 for generating a reduced image similarly to Embodiment 2.

The image correction unit 203 receives the synthesized image to be corrected. This synthesized image is an image to be corrected and is also the first reference image.

The image correction unit 203 receives the reduced image generated based on the preceding synthesized image generated by the photographing process of the previous timing of the synthesized image to be corrected from the frame memory 401. This reduced image is used as the second reference image.

The synthesized image generation unit 201, the image analysis unit 202 and the image correction unit 203 basically have the same configuration as Embodiment 1 and execute the same process. The image correction unit 203 performs the process using two reference images: (a) the first reference image=the first synthesized image including the pseudo color image which is the pixel to be corrected and (b) the second reference image=the reduced image of the second synthesized image generated based on the preceding photographed image before the first synthesized image, as the reference images.

The image analysis unit 202 generates a pseudo color determination image by the image analysis of the synthesized image. The pseudo color determination image is an image for distinguishing a pseudo color pixel and a non-pseudo color pixel described with reference to FIG. 5.

The image correction unit 203 receives the synthesized image, the reduced image and the pseudo color determination image, executes the process of correcting the pseudo color region of the synthesized image so as to generate the corrected synthesized image, and generates and outputs the output image 120.

The basic processing mode of the process of correcting the pseudo color pixel, which is executed by the image correction unit 203, is equal to that of Embodiments 1 and 2. That is, a reference region is set in the vicinity of the pseudo color pixel to be corrected, and non-pseudo color pixels and pixels having luminance values close to the luminance of the pseudo color pixel to be corrected are detected from the set reference region.

In addition, using the detected pixels as important pixels, a process of setting the weights of the important pixels of the reference region to be large and calculating the correction pixel value of the pseudo color pixel based on the pixel values of the pixels of the reference region is performed.

In Embodiment 3, the reference pixels are extracted from the two reference images. That is, the pixel values of the reference pixels are acquired from the two reference images: (a) the first reference image=the first synthesized image including the pseudo color image which is the pixel to be corrected and (b) the second reference image=the reduced image of the second synthesized image generated based on the preceding photographed image before the first synthesized image.

A detailed example of the process of correcting the pixel value, which is executed by the image correction unit 203 of the present embodiment, will be described.

Under the set parameters:

the color difference of the pixels to be corrected: $D_{a,b}(x, y)$, the color difference of the neighboring pixels of the distance (i, j) from the pixel position (x, y) of the same first reference image as the synthesized image: $N1_{a,b}(x+i, y+j)$, the color difference of the neighboring pixels of the distance (i, j) from the corresponding pixel position (X, Y)((X, Y)=(x/Q, y/Q)) of the pixel to be corrected of the second reference image (the reduced image (reduction ratio Q) of the synthesized images photographed at different timings): $N2_{a,b}(X+i, Y+j)$:

the output pixel value Ra, b(x, y) after correction of the pixel to be corrected of the synthesized image is calculated by Equation 3. In addition, with respect to the luminance $D_L(x, y)$, the set value of the input image is set to the luminance of the output image, without correction.

Equation 3

$$R_{a,b}(x, y) = \left\{ v \frac{\sum_{j=-t_{1y}}^{t_{1y}} \sum_{i=-t_{1x}}^{t_{1x}} E(i, j) C_1(x, y, i, j) P(x, y, i, j) N_{1a,b}(x+i, y+j)}{\sum_{j=-t_y}^{t_y} \sum_{i=-t_x}^{t_x} E(i, j) C_1(x, y, i, j) P(x, y, i, j)} + w \frac{\sum_{j=-t_{2y}}^{t_{2y}} \sum_{i=-t_{2x}}^{t_{2x}} C_2(X, Y, i, j) P(X, Y, i, j) N_{2a,b}(X+i, Y+j)}{\sum_{j=-t_y}^{t_y} \sum_{i=-t_x}^{t_x} C_2(X, Y, i, j) P(X, Y, i, j)} \right\} \times \overline{E}(x, y) + E(x, y) D_{a,b}(x, y)$$

$$R_{a,b}(x, y) = \frac{\sum_{j=-t_{2y}}^{t_{2y}} \sum_{i=-t_{2x}}^{t_{2x}} C_2(X, Y, i, j) P(X, Y, i, j) N_{2a,b}(X+i, Y+j)}{\sum_{j=-t_y}^{t_y} \sum_{i=-t_x}^{t_x} C_2(X, Y, i, j) P(X, Y, i, j)} \overline{E}(x, y) + E(x, y) D_{a,b}(x, y) \quad \text{if} \sum_{j=-t_y}^{t_y} \sum_{i=-t_x}^{t_x} E(i, j) = 0$$

$$C_1(x, y, i, j) = \frac{1}{\sqrt{2\pi}\sigma_c} e^{-\frac{c_1(x,y,i,j)}{2\sigma_c^2}}$$

$$c_1(x, y, i, j) = \sqrt{(D_L(x, y) - N_{1L}(x+i, y+j))^2 + (D_a(x, y) - N_{1a}(x+i, y+j))^2 + (D_b(x, y) - N_{1b}(x+i, y+j))^2}$$

$$C_2(X, Y, i, j) = \frac{1}{\sqrt{2\pi}\sigma_c} e^{-\frac{c_2(X,Y,i,j)}{2\sigma_c^2}}$$

$$c_2(X, Y, i, j) = \sqrt{(D_L(X, Y) - N_{2L}(X+i, Y+j))^2 + (D_a(X, Y) - N_{2a}(X+i, Y+j))^2 + (D_b(X, Y) - N_{2b}(X+i, Y+j))^2}$$

$$P(x, y, i, j) = \frac{1}{\sqrt{2\pi}\sigma_p} e^{-\frac{\sqrt{(x-i)^2+(y-j)^2}}{2\sigma_p}}$$

In an equation of (vp+wq) which is a term of a first half of the calculation equation of the output pixel value Ra, b(x, y) after correction of Equation 3, v, w(v+w=1) are the weights of the reference images and use predetermined values.

p is the same equation of the term of the first half of the calculation equation of the output pixel value Ra, b(x, y) after correction of Equation 1 of Embodiment 1.

q is the same equation of the term of the first half of the calculation equation of the output pixel value Ra, b(x, y) after correction of Equation 2 of Embodiment 2.

Here, in (vp+wq), p is calculated from the reference pixel selected from the same synthesized image (the first reference image) as the image to be corrected, and q is calculated from the reference pixel selected from the reduced image (the second reference image) of the synthesized image different from the image to be corrected.

The other parameters are the same parameters described in Embodiments 1 and 2.

E(i, j) is a pseudo color determination image (see FIG. 5) in which 0 is output if the pixel (i, j) is a pseudo color and 1 is output if the pseudo value is not present. (Data in which (−) is set on the upper portion of E outputs 1 if it is an inverse value of E(i, j), that is, a pseudo color, and outputs 0 if the pseudo color is not present.)

c(x, y, i, j) is ΔLab indicating a pixel value difference (distance) between the luminance $D_L(x, y)$ and the color difference $D_{a,b}(x, y)$, both of which are the pixel value configuration information of the pixel (x, y) in the Lab color space and the luminance $D_L(x+i, y+j)$ and the color difference $D_{a,b}(x+i, y+j)$, both of which are the pixel value configuration information of the first reference pixel (x+i, y+j).

C(x, y, i, j) is a Gaussian function (see FIGS. 6 and 7) of c(x, y, i, j).

P(x, y, i, j) is a Gaussian function (see FIGS. 6 and 7) of a spatial space between the pixel (x, y) and the pixel (x+i, y+j) of the first reference image.

c(X, Y, i, j) is ΔLab indicating a pixel value difference (distance) between the luminance $D_L(x, y)$ and the color difference $D_{a,b}(x, y)$, both of which are the pixel value configuration information of the pixel (x, y) in the Lab color space and the luminance $D_L(X+i, Y+j)$ and the color difference $D_{a,b}(X+i, Y+j)$, both of which are the pixel value configuration information of the reduced pixel (X+i, Y+j) of the second reference image.

C(X, Y, i, j) is a Gaussian function (see FIGS. 6 and 7) of c(X, Y, i, j).

P(X, Y, i, j) is a Gaussian function (see FIGS. 6 and 7) of a spatial space between the pixel (X, Y) located on the corresponding position of the pseudo color pixel (x, y) set with respect to the second reference image (reduced image) and the pixel (X+i, Y+j).

In addition, as described above, v, w(v+w=1) are the weights of the reference images and use predetermined values.

The image correction unit 203 calculates the color difference $R_{ab}(x, y)$ which is the color information of the output pixel after correction of the pixel (x, y) to be corrected of the synthesized image according to Equation 3.

In Equation 3, similarly to Equation 1 applied to Embodiments 1 and 2, the process of setting the non-pseudo color pixels (the pixels set to 1 in the pseudo color determination image (see FIG. 5)) and the reference pixels having the pixel value Lab close to $D_L(x, y)$ and the color difference $D_{a,b}(x, y)$, both of which are the pixel value configuration information of the pseudo color pixel to be corrected from the reference region set in the vicinity of the pseudo color pixel as important pixels, setting the weights of the important pixels to be large, setting the weights of the pixels near the pseudo color pixel to be corrected to be large, and calculating the correction pixel value of the pseudo color pixel based on the pixel values of the pixels of the reference region is performed.

As described above, in Embodiment 3, the image correction unit 203 calculates the correction pixel value by applying the plurality of different reference images. By increasing the reference image, it is possible to increase accuracy of the correction value.

In addition, although, in the process example described with reference to FIG. 12, the preceding image is referred as the reduced images, a configuration for setting the first synthesized image including the pixel to be corrected to the first reference image without performing the reduction process, setting the second synthesized image which does not include the pixel to be corrected to the second reference image without reduction, and acquiring the reference pixels from the images so as to calculate the correction pixel value may be used.

A configuration for performing a process of setting three or more different images as the reference images may be used.

3. Regarding Example of Process of Generating Reduced Image

As described in Embodiments 2 and 3, by setting a reference image used for determining the pixel value of the pseudo color pixel to a reduced image, it is possible to perform an efficient process.

Hereinafter, a detailed process example of a process of generating the reduced image will be described.

An example of a process of generating the reduced image will be described with reference to FIGS. 13 and 14.

Figures 1, 14B:
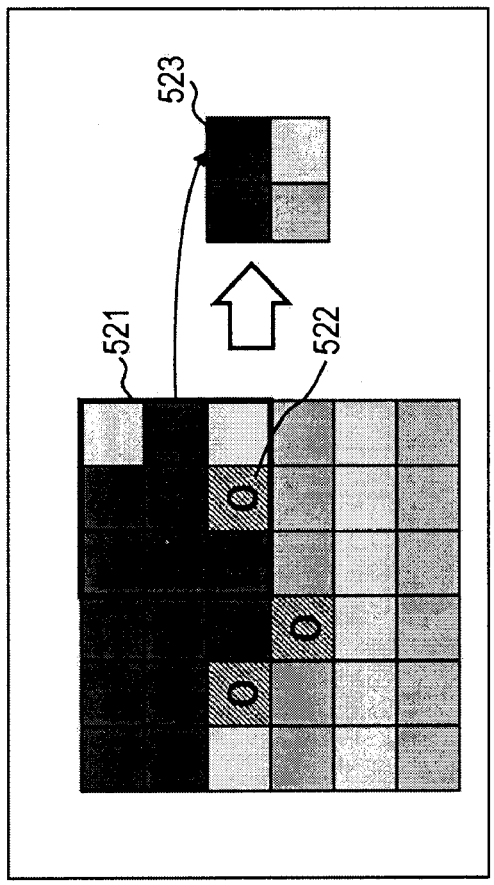
Figures 2, 14B:
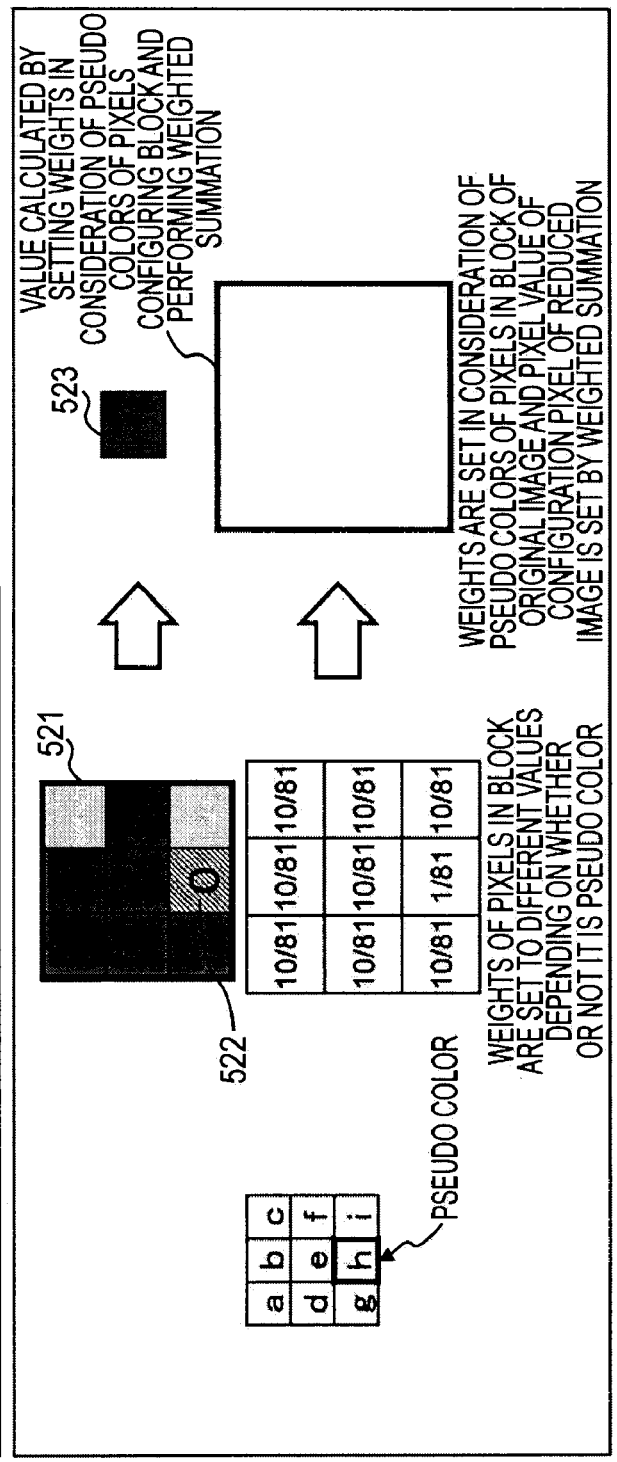

FIG. 13 shows an example of a process of generating a general reduced image and FIG. 14 shows an example of a process of generating a reduced image in consideration of the presence of a pseudo color according to one embodiment of the present invention.

First, the example of the process of generating the reduced image of the related art shown in FIG. 13.

Figure 1:
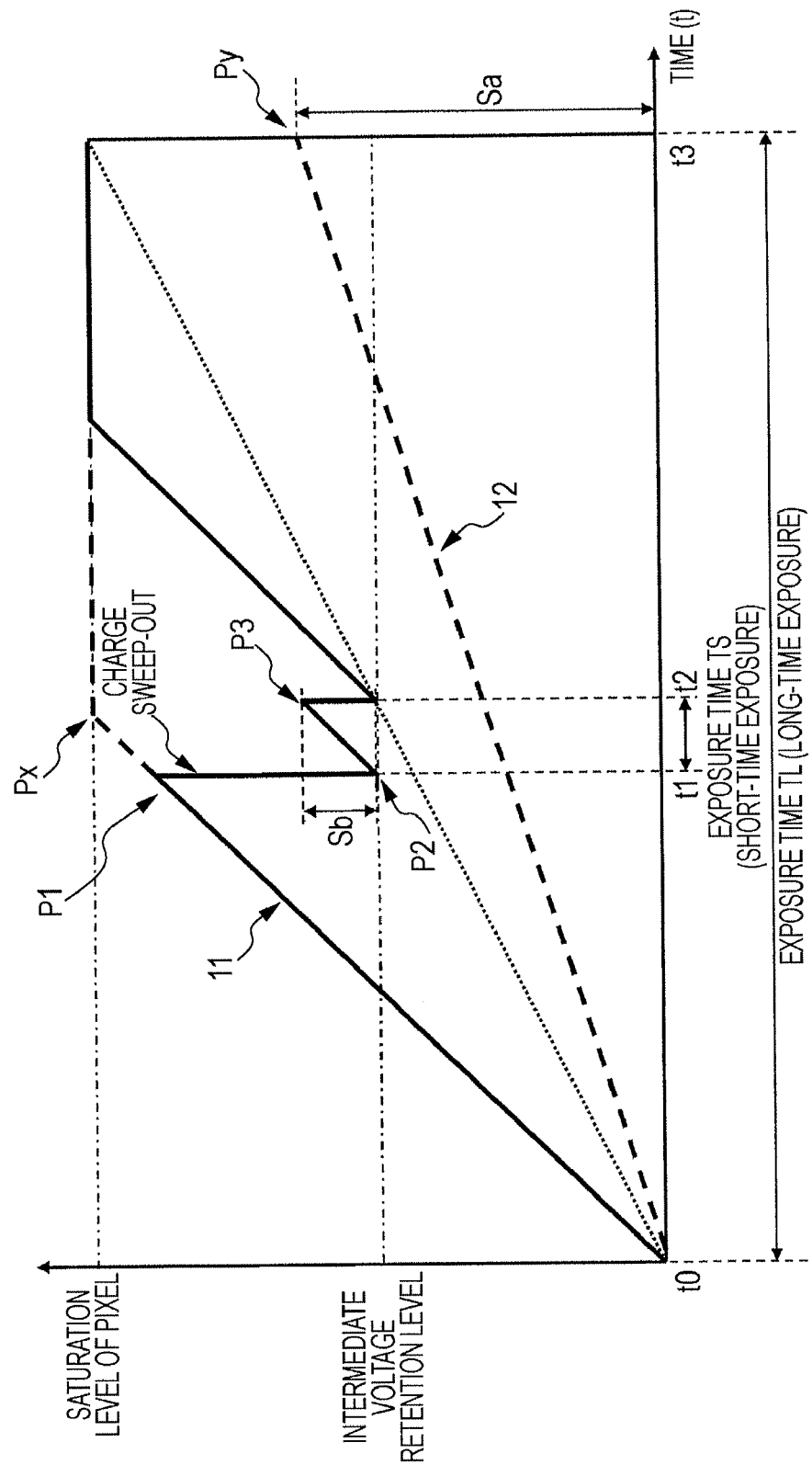
FIG. 1 is a diagram illustrating a process of synthesizing a plurality of images having different exposure amounts so as to obtain an image with a wide dynamic range.

In FIG. 13A1, an example of a process of reducing 6×6 pixels to 2×2 pixels is shown. That is, it is an example of a process of reducing 3×3 pixels of an original image to one pixel of a reduced image.

A block 501 of 3×3 pixels of a right upper side of an original image of 6×6 pixels is set as a pixel 502 of a reduced image.

A process of setting a pixel value in the reduction process of the related art will be described with reference to FIG. 13A2. An example of setting a pixel value of a pixel 502 of a right upper side of the reduced image of 2×2 pixels will be described.

As shown in FIG. 13A2, the pixel value of the pixel 502 of the right upper side of the reduced image is set as an average value of the pixel values of 9 pixels configuring the block 501 of 3×3 pixels of the right upper side of the original image of 6×6 pixels.

The calculation equation of the pixel value of the general reduced image is expressed by Equation 5.

The reduction process generates the reduced image having a size of 1/n of that of the original image.

The pixel value of the pixel of the pixel position (i, j) of the reduced image is set to $P_{L,a,b}(i, j)$. At this time, the pixel value $P_{L,a,b}(i, j)$ of the pixel of the pixel position (i, j) of the reduced image is calculated by Equation 4.

$$P_{L,a,b}(i, j) = \frac{1}{n^2} \sum_{k,l=ni}^{n(i+1)-1} P_{L,a,b}(k, l) \quad \text{Equation 4}$$

In the above equation, i, j are coordinates indicating the pixel position of the reduced image and respectively denote the pixel positions in the x and y directions. $P_{L,a,b}(k, l)$ corresponds to the pixel values of the configuration pixels of the original image before reduction and is the pixel values of the 3×3=9 pixels before reduction in the example shown in FIG. 13A2. In the example shown in FIG. 13A2, for example, when the pixel values of the pixels included in the block 501 of the 3×3 pixels of the right upper side of the original image before reduction are a, b, c, d, e, f, g, h and i, the pixel value $P_{L,a,b}(i, j)$ of the pixel 502 of the reduced image is calculated by the following equation.

$P_{L,a,b}(i,j)=(1/9)a+(1/9)b+(1/9)c+(1/9)d+(1/9)e+(1/9)f+(1/9)g+(1/9)h+(1/9)i$

By the above equation, the pixel value $P_{L,a,b}(i, j)$ of the reduced image is calculated.

However, when the pixel value is set by the average value, in an image including a pseudo color, the influence of the pseudo color is left in the pixel value set in the reduced image. In the present invention, as shown in FIG. 14, when the reduced image is generated, a reduced image in which the influence of the pseudo color is reduced is generated in consideration of the presence of the pseudo color in each pixel.

Even in FIG. 14, as described with reference to FIG. 13, as shown in FIG. 14B1, an example of a process of reducing 6×6 pixels to 2×2 pixels is shown. That is, it is an example of a process of reducing 3×3 pixels of an original image to one pixel of a reduced image.

A block 521 of 3×3 pixels of a right upper side of an original image of 6×6 pixels is set as a pixel 523 of a reduced image.

In the block 521 of the 3×3 pixels of the right upper side of the original image of the 6×6 pixels, one pseudo color pixel 522 is included.

The setting of the pixel value of the process of generating the reduced image according to the embodiment of the present invention is performed as shown in FIG. 14B2.

As shown in FIG. 14B2, it is determined whether each of 9 pixels configuring the block 521 of the 3×3 pixels of the right upper side of the original image of the 6×6 pixels is a pseudo color pixel or a non-pseudo color pixel. In addition, as the determination information, for example, the pseudo color determination image generated by the image analysis unit 202 in the image processing unit 104 described in Embodiments 1 to 3 may be used.

Next, with respect to each pixel included in the block of the 3×3 pixels of the right upper side of the original image of the 6×6 pixels, the weight of each pixel in the block is set, that is, is set to different values depending on whether it is a pseudo color. In detail, the weight is set to be small if it is a pseudo color pixel and is set to be large if it is a non-pseudo color pixel. In the example shown in the drawing, the weight is set as follows.

Pseudo color pixel=($1/81$)
Non-pseudo color pixel=($10/81$)

Next, the pixel value of the reduced image is determined by summing values obtained by multiplying the pixel values P(x, y) of the pixels included in the block of the 3×3 pixels of the right upper side of the original image of the 6×6 pixels by the weight k(x, y). That is, the pixel value of the configuration pixel of the reduced image is set by weighted summation in which the weight is set in consideration of the pseudo color of each pixel in the block of the original image.

The calculation equation of the pixel value of the reduced image according to the embodiment of the present invention is expressed by Equation 5. The reduction process generates the reduced image having a size of 1/n of that of the original image. The pixel value of the pixel of the pixel position (i, j) of the reduced image is set to $P_{L,a,b}(i, j)$.

At this time, the pixel value $P_{L,a,b}(i, j)$ of the pixel of the pixel position (i, j) of the reduced image is calculated by Equation 5.

$$P_{L,a,b}(i, j) = \frac{1}{num} \sum_{k,l=ni}^{n(i+1)-1} P_{L,a,b}(k, l) E(k, l) \quad \text{Equation 5}$$

In the above equation, i, j are coordinates indicating the pixel position of the reduced image and respectively denotes the pixel positions in the x and y directions.

$P_{L,a,b}(k, l)$ corresponds to the pixel values of the configuration pixels of the original image before reduction and is the pixel values of the 3×3=9 pixels before reduction in the example shown in FIG. 14B2.

E(k, l) is a pseudo color determination image (see FIG. 5) in which 0 is output if the pixel (k, l) of the configuration pixel of the original image before reduction and 1 is output if the pseudo color is not present.

num is the number of E(k, l)=1 in Σ.

In addition, if the overall pixel block region of the original image corresponding to one pixel of the reduced image is a pseudo color and num=0, as an exception process, a pixel value of an adjacent block is applied or a process of calculating a general average value or the like is performed.

In the example shown in FIG. 14B2, for example, when the pixel values of the pixels included in the block 521 of the 3×3 pixels of the right upper side of the original image before reduction are a, b, c, d, e, f, g, h (=pseudo color) and i, the pixel value $P_{L,a,b}(i, j)$ of the pixel 523 of the reduced image is calculated by the following equation.

$$P_{L,a,b}(i,j) = (10/81)a + (10/81)b + (10/81)c + (10/81)d + (10/81)e + (10/81)f + (10/81)g + (1/81)h + (10/81)i$$

By the above equation, the pixel value $P_{L,a,b}(i, j)$ of the reduced image is calculated.

At the time of the process of calculating the pixel values of the reduced image, by setting the weight of the pseudo color pixel to be lower than that of the non-pseudo color pixel (for example, 1/10), it is possible to reduce the influence of the pseudo color pixel on the pixel values of the configuration pixels of the reduced image and to generate the high-quality reduced image in which the influence of the pseudo color is reduced. Thus, when the reference image is used for correction, the correction is more appropriately performed.

In addition, the process of generating the reduced image, which is described with reference to FIG. 14, is, for example, applicable to the process of generating the reduced image in the reduced image generation unit 331 of Embodiments 2 and 3.

In addition, for example, a configuration in which the reduced image generation unit 331 in Embodiments 2 and 3 performs a process of performing a low-pass filter with respect to a color difference component of the reduced image after generating the reduced image may be used. By applying the low-pass filter to the reduced image so as to convert the pixel values of the reduced image, if a high frequency component is reduced and an extreme value largely different from the surrounding area is present in the pixel values of the reference pixels acquired from the reduced image, it is possible to reduce the influence thereof, to reduce the influence generated by employing erroneous pixel values as the reference pixel values, and to perform the correction process with high accuracy. In addition, even when the process of performing reduction without considering the pseudo color (see FIG. 13), it is possible to enable the pseudo color portion to be blurred so as to be inconspicuous by performing the low-pass filter.

4. Regarding Example of Process of Applying Different Color Spaces

Although, in the above embodiments, a process example of applying the Lab color space as the color space is described, the present invention is not limited to the Lab color space and may be used in the case where the other color space is applied.

In Embodiments 1 to 3, each of the configuration pixels of the synthesized image has the pixel value corresponding to the Lab color space. That is, each pixel has luminance information L and the color difference ab which is the color information, as the configuration information of the pixel value. The case where the image to be corrected does not have the pixel values corresponding to the Lab color space and has, for example, pixel information corresponding to a YCbCr color space will be described.

If the pixel value information for the YCbCr color space is used as the pixel value of each pixel of the image to be corrected, Cb and Cr values of YCbCr may be used, instead of the color difference ab which is the color information corresponding to the Lab color space. In addition, a Y value of YCbCr may be used instead of L which is the luminance information corresponding to the Lab color space. In addition, as the pixel value difference, ΔYCbCr may be used instead of ΔLab.

5. Regarding Other Modified Embodiment

Next, the other modified process example of Embodiments 1 to 3 will be described.

5-1. Modified Example of Process of Calculating Weight Coefficient

In Embodiments 1 to 3, for example, if the weight coefficients: the weight coefficient according to pixel value similarity (similarity weight coefficient) $C(x, y, i, j)$ and the weight coefficient according to the distance between pixels (pixel position weight coefficient) $P(x, y, j)$ are set, the weights are set by applying the Gaussian function as described with reference to FIGS. 6 and 7.

In Embodiments 1 to 3, for example, if the weight coefficient according to pixel value similarity (similarity weight coefficient) $C(x, y, i, j)$ is calculated, the input to the Gaussian function uses the pixel values of the pseudo color pixel to be corrected and the reference pixels and, in the embodiment, a norm indicating a difference (distance) of Lab.

In detail, the norm shown in Equation 6 is used as the input to the Gaussian function.

$$\sqrt{\begin{array}{c}(D_L(x,y)-D_L(x',y'))^2 + \\ (D_a(x,y)-D_a(x',y'))^2 + (D_b(x,y)-D'_b(x',y'))^2\end{array}} \quad \text{Equation 6}$$

Instead of this norm, a difference absolute value distance shown in Equation 7 may be applied.

$$|D_L(x,y)-D_L(x',y')|+|D_a(x,y)-D_a(x',y')|+|D_b(x,y)-D_b(x',y')| \quad \text{Equation 7}$$

Figure 15:
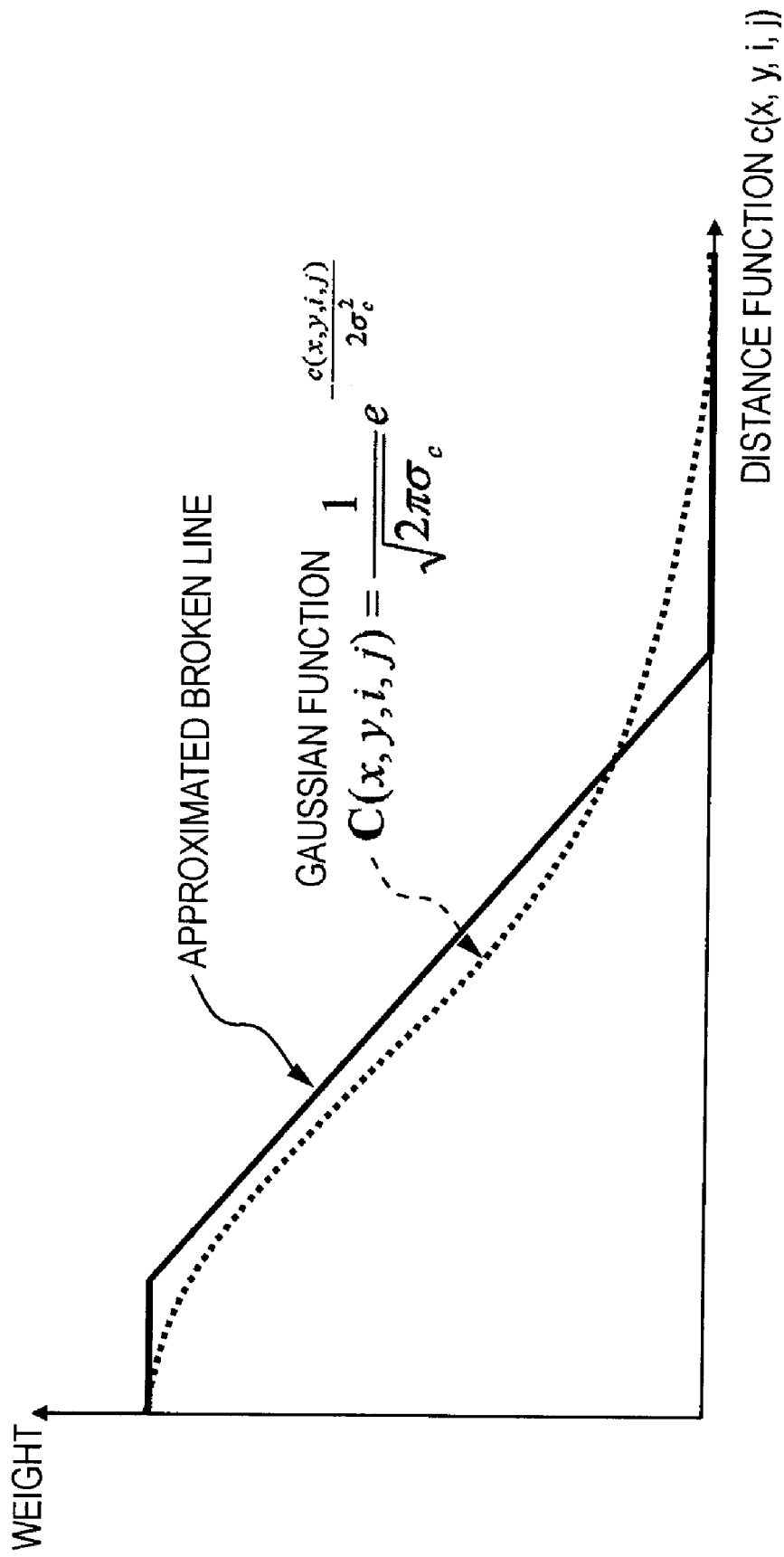
FIG. 15 is a diagram illustrating a process of setting a weight coefficient using a function of an approximated broken line instead of a Gaussian function.

In addition, if the weight coefficients: the weight coefficient according to pixel value similarity (similarity weight coefficient) $C(x, y, i, j)$ and the weight coefficient according to the distance between pixels (pixel position weight coefficient) $P(x, y, i, j)$ are set, the Gaussian function is applied as described with reference to FIGS. 6 and 7. However, instead of the Gaussian function, a configuration for performing an approximation process using a function indicating an approximated broken line shown in FIG. 15 or a fixed value and calculating the weight coefficients may be used. It is possible to reduce the computation amount by performing approximation by a simple function.

5-2. Example of Process of Correcting Luminance Value

In the above embodiments, at the time of the correction process of the pseudo color, only the color difference ab as the color information of the Lab color space was set as an object to be changed and the luminance information L was not set as an object to be corrected.

In the processes of Embodiments 1 to 3, the pixel information other than the color difference ab such as the luminance information L may be changed.

A determination as to whether or not this process is performed is preferably made according to the property of the image to be corrected.

For example, the image to be corrected includes the following four types.

1: the luminance is correct and the color difference is also correct,
2: the luminance is erroneous but the color difference is correct,
3: the luminance is correct but the color difference is erroneous, and
4: the luminance is erroneous and the color difference is also erroneous.

Embodiments 1 to 3 aids the case 3, that is, the case "the luminance is correct but the color difference is erroneous."

In the case 1, the correction process is unnecessary and, in the case 3, the processes of Embodiments 1 to 3 are preferable. In the cases 2 and 4, the process of correcting the luminance is preferably executed.

5-3. Process of Applying Blurring Process to Corrected Image

Although, in Embodiments 1 to 3, the image subjected to the pseudo color correction is output as a final processed image, a configuration for performing a blurring process using the low-pass filter with respect to the corrected image subjected to the pseudo color correction may be used. In addition, the application position of the low-pass filter is set to only the pixel portion in which the pseudo color correction is executed. By using the low-pass filter, a sense of incongruity caused by the color difference in the image to be corrected is reduced. In addition, the low-pass filter may be used for only the color difference component.

Up to now, the present invention was described in detail with reference to the specific embodiments. However, it is apparent that the embodiments may be modified and replaced by those skilled in the art without departing from the scope of the present invention. That is, since the present invention is exemplarily disclosed, the present invention is restrictively analyzed. The scope of the present invention is determined with consideration of claims.

A series of processes described in the specification may be executed by hardware, software or a combination thereof. If the processes are executed by software, a program having a processing procedure recorded therein may be installed in a memory of a computer in which dedicated hardware is assembled or may be installed in a general-purpose computer for executing various processes so as to be executed. For example, the program may be recorded on a recording medium in advance. In addition to the installation from the recording medium to the computer, the program may be received through a network such as Local Area Network (LAN) or the Internet and may be installed on the recording medium such as a built-in hard disk.

In addition, the various processes described in the specification may be executed in parallel or individually as necessary or according to the processing capability of the device for executing the processes, in addition to the time-series execution. In the present specification, the system is a logical set of a plurality of devices and is not limited to a system in which the devices having the respective configurations are included in the same apparatus.

The present application contains subject matter related to that disclosed in Japanese Priority Patent Application JP 2010-044944 filed in the Japan Patent Office on Mar. 2, 2010 and Japanese Priority Patent Application JP 2009-216530 filed in the Japan Patent Office on Sep. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing device comprising:
an image correction unit which receives a synthesized image generated by synthesizing a plurality of images and pseudo color pixel information, the pseudo color pixel information indicating a pseudo color pixel position included in the synthesized image, and executes pixel value correction using a pseudo color pixel in the synthesized image as a pixel to be corrected, wherein the image correction unit:

selects non-pseudo color pixels, which are not determined as a pseudo color based on the pseudo color pixel information, as reference pixels, from a reference region set in a region surrounding the pixel to be corrected, sets a similarity weight coefficient in which a large weight is set as a pixel value of the reference pixel that is close to a pixel value of the pixel to be corrected, and a pixel position weight coefficient in which a large weight is set as the pixel value of the reference pixel that is near a pixel position of the pixel to be corrected, with respect to the reference pixels, and determines a correction pixel value of the pixel to be corrected by a weighted summation process of summing values obtained by multiplying the pixel values of the reference pixels by the similarity weight coefficient and the pixel position weight coefficient.

2. The image processing device according to claim 1, wherein the image correction unit calculates the similarity weight coefficient according to a difference in pixel value configuration information of the pixels of the synthesized image.

3. The image processing device according to claim 2, wherein:

pixel value information corresponding to a Lab color space is set in each of the pixels of the synthesized image, and the image correction unit calculates the similarity weight coefficient according to the difference in each of luminance L and a color difference ab, both of which are pixel value configuration information of the pixels of the synthesized image.

4. The image processing device according to any one of claims 1 to 3, further comprising a reduced image generation unit which executes a process of reducing the synthesized image, wherein the image correction unit sets the reference region in the reduced image generated by the reduced image generation unit, and applies a reference pixel selected from the reference region set in the reduced image co as to calculate the similarity weight coefficient and the pixel position weight coefficient.

5. The image processing device according to any one of claims 1 to 3, wherein a second synthesized image based on an image photographed at a timing different from a first synthesized image including the pixel to be corrected or a reduced image of the second synthesized image, is received as a second reference image, a second reference region is set with respect to the second reference image in the vicinity of the pixel position corresponding to the pixel to be corrected of the first synthesized image, non-pseudo color pixels included in the second reference region are selected as reference pixels, the similarity weight coefficient and the pixel position weight coefficient are set with respect to the selected reference pixels, and both the reference pixels selected from the synthesized image including the pixel to be corrected and the reference pixels selected from the second reference region are applied so as to determine the correction pixel value of the pixel to be corrected by a weighted summation process of summing values obtained by multiplying the pixel values of the reference pixels by the similarity weight coefficient and the pixel position weight coefficient.

6. The image processing device according to any one of claims 1 to 3, wherein the image correction unit calculates the similarity weight coefficient and the pixel position weight coefficient by applying a Gaussian function.

7. The image processing device according to any one of claims 1 to 3, further comprising an image analysis unit which receives the synthesized image and executes detection of the pseudo color pixel included in the synthesized image so as to generate the pseudo color pixel information, wherein the image correction unit applies the pseudo color pixel information generated by the image analysis unit so as to perform the selection of the non-pseudo color pixels in the reference region.

8. The image processing device according to any one of claims 1 to 3, further comprising a synthesized image generation unit which synthesizes the plurality of images to generate the synthesized image, wherein the image correction unit executes the correction of the synthesized image generated by the synthesized image generation unit.

9. The image processing device according to any one of claims 1 to 3, wherein the synthesized image is generated by synthesizing the plurality of images photographed by setting different exposure times.

10. An imaging apparatus comprising:

an imaging device which photographs captured images of different exposure times; and the image processing unit which executes the image processing according to any one of claims 1 to 3.

11. An image processing method which executes pixel value correction in an image processing device, the image processing method comprising the steps of:

at an image correction unit:

receiving a synthesized image generated by synthesizing a plurality of images and pseudo color pixel information indicating a pseudo color pixel position included in the synthesized image; and executing the pixel value correction using a pseudo color pixel in the synthesized image as a pixel to be corrected, wherein the correction comprises:

selecting non-pseudo color pixels, which are not determined as a pseudo color based on the pseudo color pixel information, as reference pixels, from a reference region set in a surrounding region of the pixel to be corrected, setting a similarity weight coefficient in which a large weight is set as a pixel value of the reference pixel that is close to a pixel value of the pixel to be corrected, and a pixel position weight coefficient in which a large weight is set as the pixel value of the reference pixel that is near a pixel position of the pixel to be corrected, with respect to the reference pixels, and determining a correction pixel value of the pixel to be corrected by a weighted summation process of summing values obtained by multiplying the pixel values of the reference pixels by the similarity weight coefficient and the pixel position weight coefficient.

12. A non-transitory computer readable medium comprising program code for causing an image processing device to perform steps comprising:

at an image correction unit:

receiving a synthesized image generated by synthesizing a plurality of images and pseudo color pixel information indicating a pseudo color pixel position included in the synthesized image; and executing pixel value correction using a pseudo color pixel in the synthesized image as a pixel to be corrected, wherein correction comprises:

selecting non-pseudo color pixels, which are not determined as a pseudo color based on the pseudo color pixel information, as reference pixels, from a reference region set in a surrounding region of the pixel to be corrected, setting a similarity weight coefficient in which a large weight is set as a pixel value of the reference pixel that is close to a pixel value of the pixel to be corrected, and a pixel position weight coefficient in which a large weight is set as the pixel value of the reference pixel that is near a pixel position of the pixel to be corrected, with respect to the reference pixels, and determining a correction pixel value of the pixel to be corrected by a weighted summation process of summing values obtained by multiplying the pixel values of the reference pixels by the similarity weight coefficient and the pixel position weight coefficient.

\* \* \* \* \*